United States Patent
Itoh et al.

(10) Patent No.: US 8,804,537 B2
(45) Date of Patent: Aug. 12, 2014

(54) LOOP DETECTING DEVICE, SYSTEM, METHOD AND PROGRAM

(75) Inventors: Nobuhiko Itoh, Tokyo (JP); Yasuhiro Yamasaki, Tokyo (JP)

(73) Assignee: NEC Corporation, Tokyo (JP)

( * ) Notice: Subject to any disclaimer, the term of this patent is extended or adjusted under 35 U.S.C. 154(b) by 473 days.

(21) Appl. No.: 13/137,145

(22) Filed: Jul. 22, 2011

(65) Prior Publication Data

US 2011/0280145 A1 Nov. 17, 2011

Related U.S. Application Data

(63) Continuation of application No. PCT/JP2011/000437, filed on Jan. 27, 2011.

(30) Foreign Application Priority Data

Feb. 19, 2010 (JP) .................................. 2010-035096

(51) Int. Cl.
*H04L 1/00* (2006.01)
*H04L 12/26* (2006.01)

(52) U.S. Cl.
CPC ..................................... *H04L 43/16* (2013.01)
USPC ........................................................ 370/242

(58) Field of Classification Search
None
See application file for complete search history.

(56) References Cited

U.S. PATENT DOCUMENTS

| | | | |
|---|---|---|---|
| 7,953,007 B2 | 5/2011 | Aimoto et al. | |
| 2005/0286430 A1 | 12/2005 | Koga et al. | |
| 2006/0013143 A1* | 1/2006 | Yasuie et al. | 370/249 |
| 2007/0280239 A1* | 12/2007 | Lund | 370/392 |
| 2008/0107025 A1* | 5/2008 | Cho et al. | 370/235 |
| 2008/0130503 A1* | 6/2008 | Kaempfer | 370/235 |
| 2009/0022053 A1 | 1/2009 | Aimoto et al. | |

FOREIGN PATENT DOCUMENTS

| | | |
|---|---|---|
| JP | 2005-86762 A | 3/2005 |
| JP | 2006-13737 A | 1/2006 |
| JP | 2009-27400 A | 2/2009 |

OTHER PUBLICATIONS

OpenFlow Switch Specification Version 0.9.0, Jul. 20, 2009, [Searched on Feb. 4, 2010 (22nd year of the Heisei era)], Internet <http://www.openflowswitch.org/documents/openflow-spec-v0.9.0.pdf>.

International Search Report (ISR) (PCT Form PCT/ISA/210) dated Apr. 5, 2011, with partial English translation.

* cited by examiner

*Primary Examiner* — Kevin C Harper
(74) *Attorney, Agent, or Firm* — McGinn IP Law Group, PLLC

(57) ABSTRACT

A loop detecting device is provided which is capable of detecting a loop packet or a loop flow with less processing load. A sorting means 82 classifies packets from each of which information is extracted by a packet information extracting device, based on first predetermined information included in packet information, counts the number of the classified packets for each first predetermined information, and specifies first predetermined information in which a count result reaches greater than or equal to a first threshold value. A determining means 83 determines whether each packet having the first predetermined information specified by the sorting means 82 is a loop packet or whether each flow specified by the first predetermined information is a loop flow by using second predetermined information included in the packet information received by a receiving means 81 with the first predetermined information specified by the sorting means 82 as a target.

16 Claims, 16 Drawing Sheets

PAT: PATH INFORMATION

|  |  | LINK | | | | | | | |
|---|---|---|---|---|---|---|---|---|---|
|  |  | L1 | L2 | L3 | L4 | L5 | L6 | ... | LN |
| FLOW | IP:A→B | 1 | 1 | 0 | 0 | 0 | 1 | ... | 0 |
|  | IP:A→C | 1 | 1 | 0 | 0 | 0 | 1 | ... | 0 |
|  | IP:A→D | 0 | 0 | 1 | 1 | 1 | 1 | ... | 0 |
|  | IP:A→E | 0 | 0 | 1 | 1 | 1 | 0 | ... |  |
|  | IP:A→F | 0 | 0 | 0 | 0 | 0 | 0 | ... | 0 |
|  | IP:B→A | 1 | 1 | 0 | 0 | 0 | 1 | ... | 0 |
|  | IP:B→C | 0 | 0 | 1 | 0 | 0 | 0 | ... | 0 |
|  | IP:B→D | 0 | 0 | 0 | 1 | 0 | 1 | ... | 0 |
|  | : | ... | ... | ... | ... | ... | ... | ... |  |
|  | IP:E→F | 0 | 0 | 0 | 0 | 1 | 0 | ... | 0 |

LOOP DETECTING DEVICE, SYSTEM, METHOD AND PROGRAM

This application is a continuation of International Application No. PCT/JP2011/000437, filed on Jan. 27 2011 and claims priority to Japanese Patent Application No. 2010-035096 filed on Feb. 19, 2010, both of which are incorporated herein by reference in their entireties.

TECHNICAL FIELD

The present invention relates to a loop detecting device, a loop detecting system, a loop detecting method and a loop detecting program which detect loop packets continuing to stay within a network without the loop packets reaching destinations or detect loop flows including the loop packets.

BACKGROUND ART

A technique for detecting the presence or absence of excessive traffic has been described in Patent Document 1. A device described in Patent Document 1 holds a threshold value for determining whether flow reaches a flow rate greater than or equal to a predetermined bandwidth, and makes a comparison between the threshold value and the flow rate to thereby detect an excessive flow.

There is known a system in which a controller performs control on each of switches that belong to a network to thereby control a communication path or the like for each flow. An example of such a system is a system to which OpenFlow is applied. The OpenFlow is a protocol for allowing the controller to control each switch. Specifications of the OpenFlow have been described in Non-patent Document 1.

CITATION LIST

Patent Literature

Patent Document 1 JP-A-2009-27400

Non-Patent Literature

Non-Patent Document 1 "OpenFlow Switch Specification Version 0.9.0", Jul. 20, 2009, [Searched on Feb. 4, 2010 (22nd year of the Heisei era)], Internet <http://www.openflowswitch.org/documents/openflow-spec-v0.9.0.pdf>

SUMMARY OF INVENTION

Technical Problem

Each packet that continues to circulate in a network without reaching destination devices is called a loop packet. A flow including the loop packet is called a loop flow. Since a network failure may occur due to the existence of the loop packet, it is desirable to detect the loop packet and the loop flow.

In the device described in Patent Document 1, the occurrence of the loop failure can be estimated by detecting the excessive flow. It is, however, not possible to specify which packet corresponds to any loop packet. Since the excessive flow is not necessarily a loop flow, the loop flow cannot be detected with high accuracy.

When the process of detecting the loop packet or the loop flow is implemented, the used amount of memory and the amount of calculation may desirably be reduced to lighten a load on the device.

The present invention therefore aims to provide a loop detecting device, a loop detecting system, a loop detecting method and a loop detecting program each of which is capable of detecting a loop packet or a loop flow with less processing load.

Solution to Problem

A loop detecting device according to the present invention includes receiving means which receives from a packet information extracting device for extracting information from each packet transmitted and received between packet transfer devices, packet information including first predetermined information and second predetermined information in the packet; sorting means which classifies the packets from each of which information is extracted by the packet information extracting device, based on the first predetermined information included in the packet information, counts the number of the classified packets for each first predetermined information, and specifies first predetermined information in which a count result reaches greater than or equal to a first threshold value; and determining means which determines whether each packet having the first predetermined information specified by the sorting means is a loop packet or whether each flow specified by the first predetermined information is a loop flow by using the second predetermined information included in the packet information received by the receiving means with the first predetermined information specified by the sorting means as a target.

Also, a loop detecting system according to the present invention includes a packet information extracting device which extracts information from each packet transmitted and received between packet transfer devices; and a loop detecting device which detects a loop packet or a loop flow using the information extracted by the packet information extracting device, wherein: the packet information extracting device includes extracting means which extracts from each packet passing through the packet information extracting device, packet information including first predetermined information and second predetermined information in the packet, and transmitting means which transmits the packet information to the loop detecting device; and the loop detecting device includes receiving means which receives the packet information from the packet information extracting means, sorting means which classifies the packets from each of which information is extracted by the packet information extracting device, based on the first predetermined information included in the packet information, counts the number of the classified packets for each first predetermined information, and specifies first predetermined information in which a count result reaches greater than or equal to a first threshold value, and determining means which determines whether each packet having the first predetermined information specified by the sorting means is a loop packet or whether each flow specified by the first predetermined information is a loop flow by using the second predetermined information included in the packet information received by the receiving means with the first predetermined information specified by the sorting means as a target.

Further, a loop detecting method according to the present invention includes the steps of: receiving from a packet information extracting device for extracting information from each packet transmitted and received between packet transfer devices, packet information including first predetermined information and second predetermined information in the packet; classifying the packets from each of which information is extracted by the packet information extracting device, based on the first predetermined information included in the packet information, counting the number of the classified packets for each first predetermined information, and specifying first predetermined information in which a count result reaches greater than or equal to a first threshold value; and determining whether each packet having the specified first predetermined information is a loop packet or whether each flow specified by the first predetermined information is a loop flow by using the second predetermined information included in the received packet information with the specified first predetermined information as a target.

Furthermore, a loop detecting program according to the present invention causes a computer to execute a reception process for receiving from a packet information extracting device that extracts information from each packet transmitted and received between packet transfer devices, packet information including first predetermined information and second predetermined information in the packet; a sorting process for classifying the packets from each of which information is extracted by the packet information extracting device, based on the first predetermined information included in the packet information, counting the number of the classified packets for each first predetermined information, and specifying first predetermined information in which a count result reaches greater than or equal to a first threshold value; and a determination process for determining whether each packet having the first predetermined information specified in the sorting process is a loop packet or whether each flow specified by the first predetermined information is a loop flow by using the second predetermined information included in the packet information received in the reception process with the first predetermined information specified in the sorting process as a target.

Advantageous Effects of the Invention

According to the present invention, a loop packet or a loop flow can be detected with less processing load.

DESCRIPTION OF EMBODIMENTS

Exemplary embodiments of the present invention will hereinafter be described with reference to the accompanying drawings.

First Exemplary Embodiment

Figure 1:
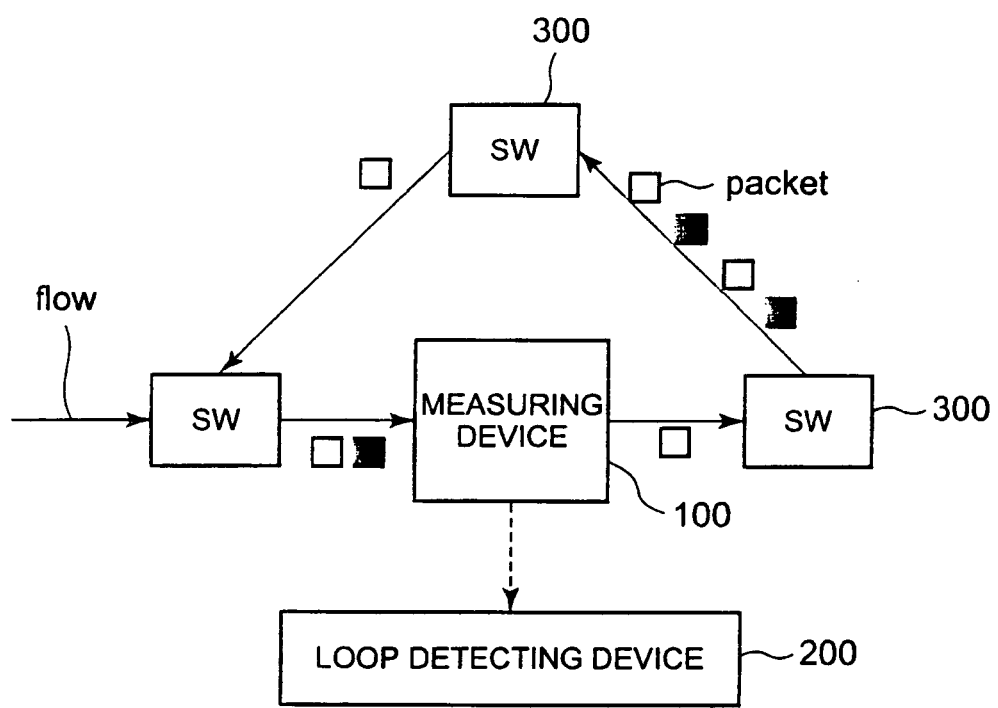
[FIG. 1] It depicts a block diagram showing an example of a loop detecting system according to a first exemplary embodiment of the present invention.

FIG. 1 is a block diagram showing an example of a first exemplary embodiment of a loop detecting system of the present invention. The loop detecting system of the present invention is provided with a measuring device 100 and a loop detecting device 200. The measuring device 100 is disposed between switches 300 for transferring packets within a network and extracts information from the packets transmitted and received between the switches 300. The measuring device 100 may be achieved by the switch 300. That is, the switch 300 may be configured to operate as the measuring device 100.

The network is configured by a plurality of switches 300. Packets of plural flows are transferred to a destination device via the respective switches. A loop flow may however occur. The respective switches 300 may be referred to as packet transfer devices which transfer packets.

The measuring device 100 performs the measurement of each flow. Here, the term "measurement" means that information is extracted from each packet. That is, the measuring device 100 extracts information from each packet that passes therethrough. Thus, the measuring device 100 can also be referred to as a packet information extracting device. The measuring device 100 is achieved by a router, for example.

In the present exemplary embodiment, the loop detecting device 200 is connected to the measuring device 100 and detects a loop packet or a loop flow, based on the information extracted by the measuring device 100. For ease of explanation, the following description will be made of, as an example, the case where the loop detecting device 200 detects a loop packet. The loop detecting device 200 is achieved by a server computer, for example. The loop detecting device 200 may be connected to a plurality of measuring devices 100. In such a case, the loop detecting device 200 performs processing for each measuring device 100. Further, the loop detecting device 200 and the measuring device 100 may be achieved by the same device.

Information (hereinafter described as a flow identifier) for identifying each flow will be explained herein. The respective flows can be identified by, for example, parameters such as a transmitting side IP address, a receiving side IP address, a transmitting side port number, a receiving side port number, a transmitting side MAC (Media Access Control) address, a receiving side MAC address, a protocol ID (identification information of protocol), etc. Thus, a combination of one or more parameters illustrated above can be used as a flow identifier. Incidentally, for the designations of the parameters illustrated by way of example, the "transmitting side" means a "transmission source", and the "receiving side" means a "destination". Although the following description shows as an example the case where "a set of the transmitting side MAC address and the receiving side MAC address" is used as a flow identifier, a combination of other parameters may be taken as a flow identifier. One parameter may be used as a flow identifier. Parameters other than the parameters illustrated by the example may be used as flow identifiers. Packets having a common flow identifier are packets of the same flow.

Figure 2:
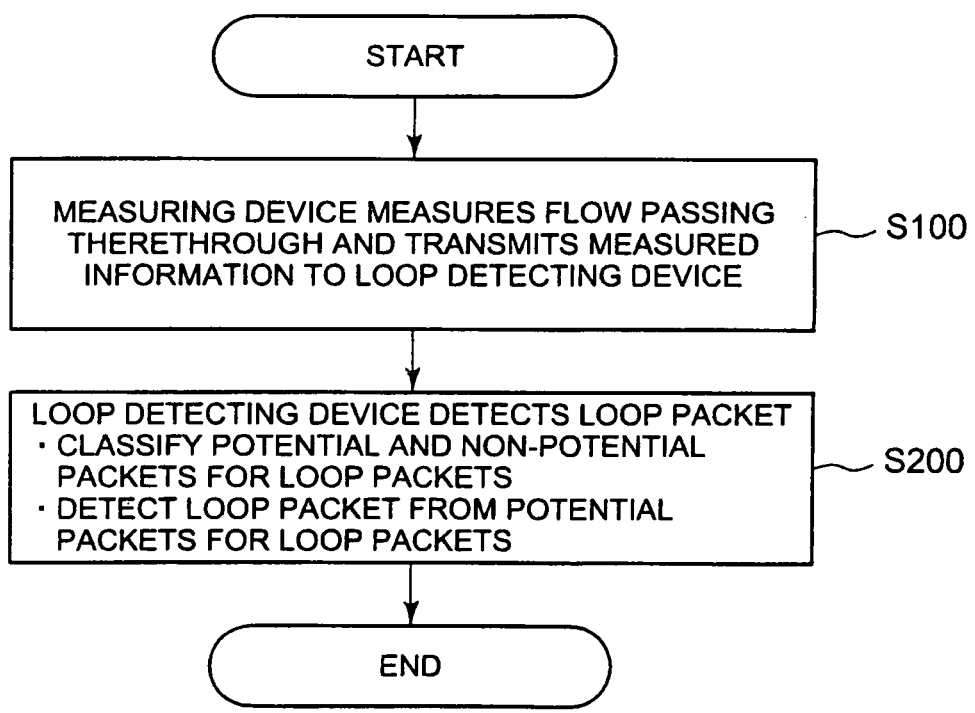
[FIG. 2] It depicts a flowchart illustrating operation according to the first exemplary embodiment.

FIG. 2 is a flowchart showing operation according to the first exemplary embodiment.

The measuring device 100 measures a flow that passes therethrough. That is, the measuring device 100 extracts information from a packet that passes therethrough. Then, the measuring device 100 transmits the extracted information to the loop detecting device 200 (step S100). At this time, the measuring device 100 converts the extracted information to a format receivable by the loop detecting device 200 and transmits the converted information to the loop detecting device 200.

The information extracted from the packet and converted to the format receivable by the loop detecting device 200 is described as measurement information and expressed by symbol MSR. The measuring device 100 performs format conversion on the information extracted from the packet in accordance with the format of an xFlow technique such as sFlow, NetFlow, PSAMP, IPFIX or the like. The measuring device 100 may create measurement information MSR using information dumped at full capture.

The measurement information MSR includes a flow identifier and a payload of each packet. As in the case of a modification of the first exemplary embodiment to be described later, however, the measurement information MSR may be generated so as to include a flow identifier and a TTL (Time-to-Live) of a packet.

The present exemplary embodiment will explain, as an example, the case where the measuring device 100 generates measurement information MSR in accordance with the format of sFlow. In this case, the measuring device 100 extracts information about a header of 128 bytes of a received packet. This information contains a flow identifier and a Payload of the packet.

The measuring device 100 periodically transmits the measurement information MSR to the loop detecting device 100.

The loop detecting device 200 receives the measurement information MSR from the measuring device 100 and checks on the presence or absence of a loop packet, based on the measurement information MSR. If there is a packet determined to be the loop packet, the loop detecting device 200 detects the packet as the loop packet (step S200). In step S200, the loop detecting device 200 specifies a potential packet for the loop packet using the flow identifier included in the measurement information MSR. The loop detecting device 200 determines, using the flow identifier and payload included in the measurement information MSR, whether the specified packet corresponds to the loop packet.

More specifically, in the process of specifying the potential packet for the loop packet, the loop detecting device 200 classifies packets each corresponding to a source for extraction of each flow identifier (set of transmitting side MAC address and receiving side MAC address) included in the received measurement information MSR in accordance with the flow identifier and counts the number of packets every flow identifier. The result of counting performed every flow identifier means the number of packets (i.e., the observed packet number for each flow) for every flow observed by the measuring device 100. Since loop packets are packets that continue to stay within the network, there is a high possibility that the loop packets are observed plural times by the measuring device 100. Therefore, the loop detecting device 200 specifies a packet for each flow in which the value of the count result reaches greater than or equal to a prescribed threshold value (hereinafter described as a candidate specifying threshold value) as a potential packet for a loop packet. Each potential packet for the loop packet is described as a loop packet candidate below. It can be said that each flow in which the value of the count result reaches greater than or equal to the candidate specifying threshold value is taken as a loop flow candidate. Incidentally, each loop flow is a flow specified by the flow identifier of the loop packet.

In the process of determining whether the packet is of the loop packet with each loop packet candidate as a target, the loop detecting device 200 sorts the loop packet candidates for every set of flow identifiers and payloads with reference to flow identifiers and payloads included in measurement information MSR extracted from the loop packet candidates, and counts the number of the sorted loop packet candidates. This counted result means the number of observations for every packet (loop packet candidate) by the measuring device 100. The loop detecting device 200 determines a loop packet candidate in which this counted result reaches greater than or equal to a prescribed threshold value (hereinafter described as a loop packet determining threshold value), as a loop packet.

Thus, in step S200, the loop packet candidate is first specified. The number of observations of loop packet candidates each including the same flow identifier and payload is counted with the loop packet candidate as a target. It is determined from the counted result whether the packet corresponds to the loop packet. Each of the loop packet candidates (i.e., target at which the number of observed packets is counted using the flow identifiers and the payloads) is determined and the search for each payload is performed only on the loop packet candidate. For this reason, processing loads such as the used amount of memory, the amount of calculation, etc. can be reduced as compared with the case where payloads are searched for all packets.

Examples of configurations and operations of the respective devices will be explained in detail below.

Figure 3:
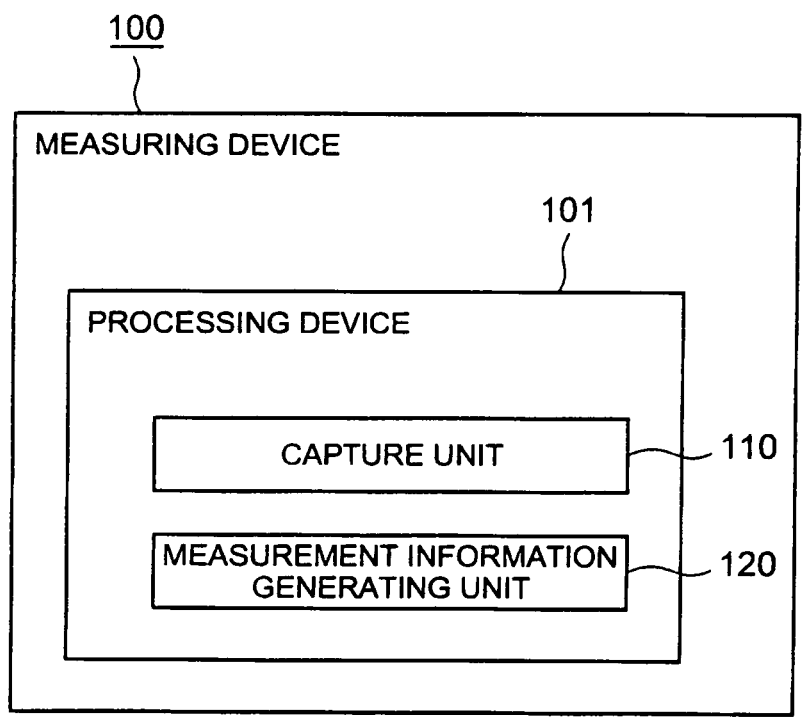
[FIG. 3] It depicts a block diagram showing a configuration example of a measuring device.

FIG. 3 is a block diagram showing a configuration example of the measuring device 100. The measuring device 100 is provided with a processing device 101 that performs measurement. The processing device 101 includes a capture unit 110 which captures information from each packet that passes through the measuring device 100 itself, and a measurement information generating unit 120 which generates measurement information MSR by performing format conversion on the information captured by the capture unit 110. The capture unit 110 and the measurement information generating unit 120 are achieved by, for example, a CPU of a computer operating in accordance with a program. In this case, a program storage unit (not shown) of the measuring device 100 stores a program therein. A CPU of the measuring device 100 is operated as the capture unit 110 and the measurement information generating unit 120 in accordance with the program. The capture unit 110 and the measurement information generating unit 120 may be achieved by discrete units respectively.

In step S100 (refer to FIG. 2), the capture unit 110 captures information about a header of 128 bytes from the packet that passes through the measuring device 100. That is, the capture unit 110 extracts the information about the header of 128 bytes from the packet. This information includes a flow identifier (transmitting side MAC address and receiving side MAC address) and a payload. Incidentally, the capture unit 110 may periodically capture information from each packet. Alternatively, the capture unit 110 may select each packet at random and capture information from the selected packet.

The measurement information generating unit 120 converts the information captured by the capture unit 110 to the format of sFlow to thereby generate measurement information MSR. The measurement information generating unit 120 periodically transmits the generated measurement information MSR to the loop detecting device 200.

Although the present exemplary embodiment has explained as an example the case where sFlow is applied to the transmission/reception of the measurement information MSR between the measuring device 100 and the loop detecting device 200, other techniques such as NetFlow, PSAMP, IPFIX and the like may be applied thereto. When the techniques other than sFlow are applied, the information extracted from the packet is not limited to 128 bytes of the header.

Figure 4:
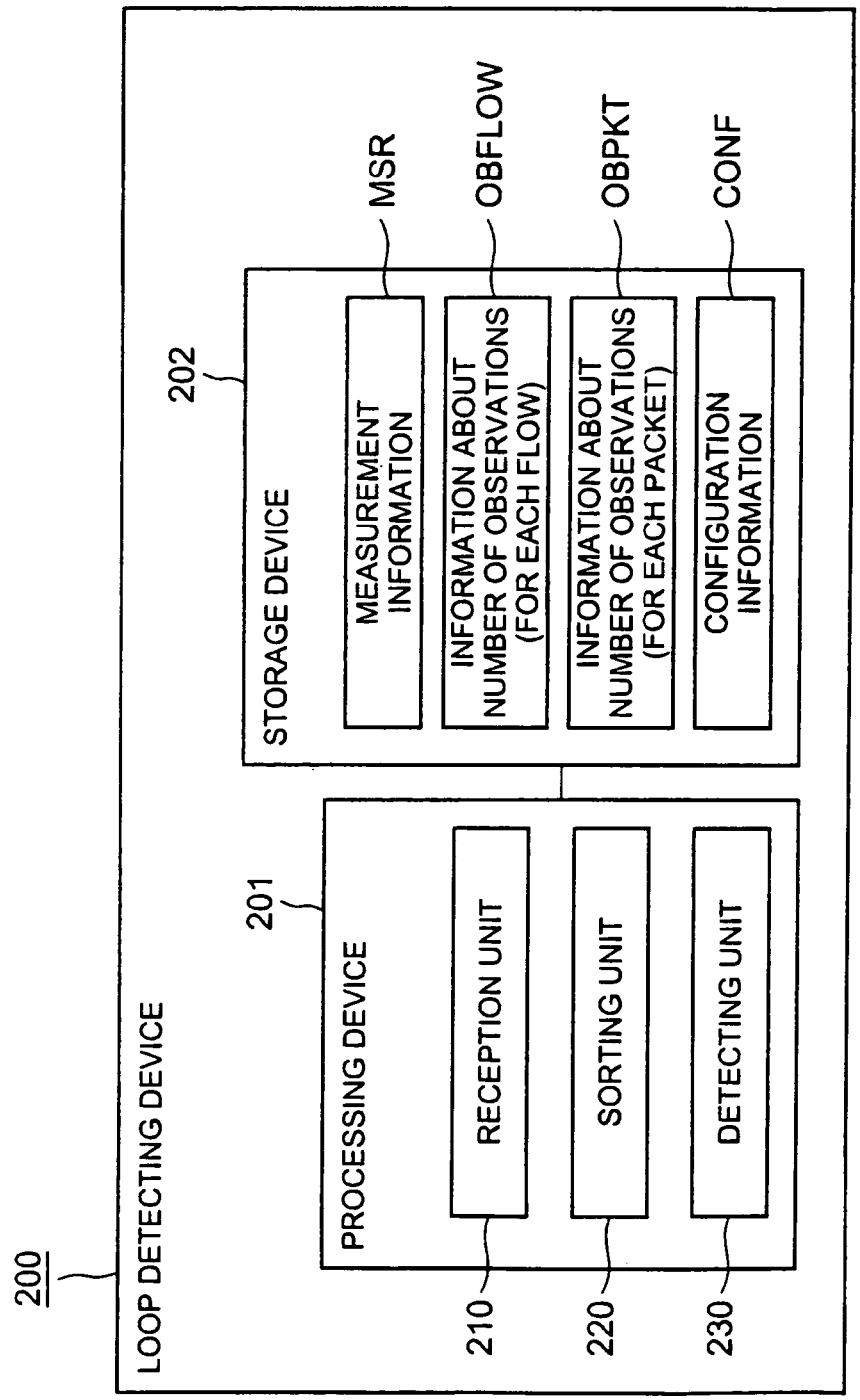
[FIG. 4] It depicts a block diagram showing a configuration example of a loop detecting device.

FIG. 4 is a block diagram showing a configuration example of the loop detecting device 200. The loop detecting device 200 is equipped with a processing device 201 which performs the identification of each loop packet candidate and determination of each loop packet, and a storage device 202.

The processing device 201 performs writing and reading on the storage device 202 and proceeds with processing. The processing device 201 includes a reception unit 210, a sorting unit 220, and a detecting unit 230. The reception unit 210 receives the measurement information MSR transmitted by the measuring device 100. The sorting unit 220 specifies the corresponding loop packet candidate. The detecting unit 230 determines whether the loop packet candidate is of a loop packet and detects the corresponding loop packet.

The reception unit 210, the sorting unit 220 and the detecting unit 230 are achieved by a CPU of a computer operating in accordance with a loop detecting program, for example. In this case, a program storage unit (not shown) of the loop detecting device 200 stores the loop detecting Program therein. The CPU of the loop detecting device 200 may operate as the reception unit 210, the sorting unit 220 and the detecting unit 230 in accordance with the loop detecting program. In this case, the processing device 201 corresponds to the CPU. The reception unit 210, the sorting unit 220 and the detecting unit 230 may be achieved by discrete units respectively.

The storage device 202 is achieved by a RAM (Random Access Memory) or HDD (Hard Disk Drive), for example. The storage device 202 stores therein measurement information MSR, information about the number of observations for each flow OBFLOW, information about the number of observations for each packet OBPKT, and configuration information CONF.

The measurement information MSR is information received from the measuring device 100 and includes each flow identifier and payload of a packet that becomes a source of the measurement information MSR.

Figure 5:
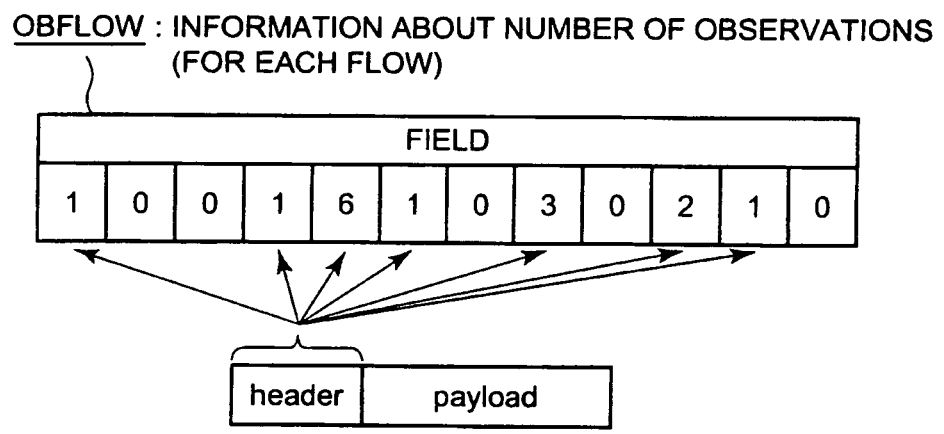
[FIG. 5] It depicts an explanatory diagram conceptually showing one example of information about the number of observations for every flow.

The information about the number of observations for each flow OBFLOW is information indicative of the number of observations for each flow at the measuring device 100. In the present exemplary embodiment, a counting filter that is a kind of a bloom filter is used in a data structure of the information about number of observations for each flow OBFLOW. FIG. 5 is an explanatory diagram conceptually showing one example of information about the number of observations for each flow OBFLOW. The storage device 202 stores a count result of the observed packet number for each flow identifier (in other words, number of observations for each flow) in a field set for each flow. Flow identifiers lying within packet headers included in the measurement information MSR are used for classification of the flows, and no payload is taken into consideration. The sorting unit 220 refers to each flow identifier in the measurement information MSR received from the measuring device 100 and increments a count value of a field corresponding to the flow identifier by one. The sorting unit 220 determines a packet for a flow in which the count value reaches greater than or equal to a candidate specifying threshold value, as a loop packet candidate. It can also be said that this processing is a process for determining the flow in which the count value has reached greater than or equal to the candidate specifying threshold value, as a loop flow candidate.

Figure 6:
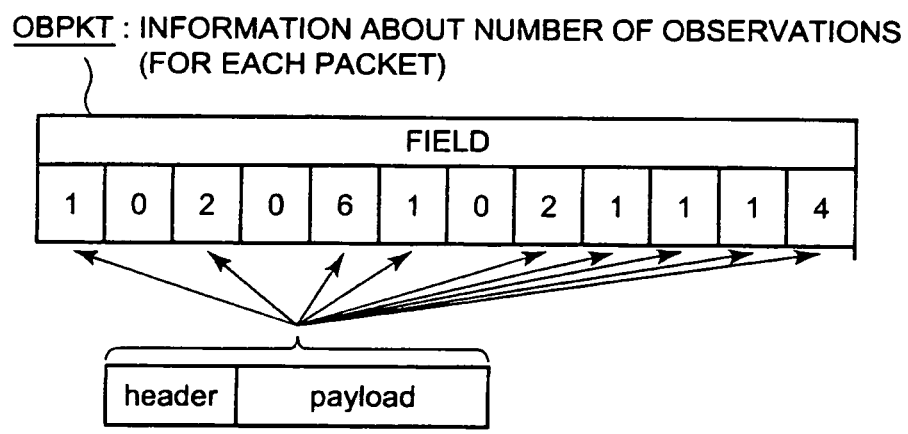
[FIG. 6] It depicts an explanatory diagram conceptually illustrating one example of information about the number of observations every packet.

The information about the number of observations for each packet is information indicative of the observed number of each packet (more specifically, loop packet candidate) at the measuring device 100. In the present exemplary embodiment, a counting filter that is a kind of bloom filter is used in a data structure of the information about the number of observations for each packet OBPKT. FIG. 6 is an explanatory diagram conceptually showing one example of information about the number of observations for each packet OBPKT. The storage device 202 stores the number of observations obtained by the measuring device 100 in the field set for each packet. Flow identifiers in packet headers and payloads included in the corresponding measurement information MSR are used for classification of the packets. The detecting unit 230 refers to each flow identifier and payload in the measurement information MSR received from the measuring device 100 and increments a count value of a field corresponding to a set of the corresponding flow identifier and payload by one. The detecting unit 230 determines, as a loop packet, a loop packet candidate corresponding to a field at which the count value reaches greater than or equal to a loop packet determining threshold value.

Incidentally, although there is shown herein the case in which the counting filter is used in the data structure of the information about the number of observations for each flow OBFLOW or the information about the number of observations for each packet OBPKT, other data structures may be used.

The configuration information CONF is information that includes various set values related to the loop detecting device 200, such as a period for refreshing the information about the number of observations for each flow OBFLOW and the information about the number of observations for each packet OBPKT, the candidate specifying threshold value, the loop packet determining threshold value, etc.

Figure 7:
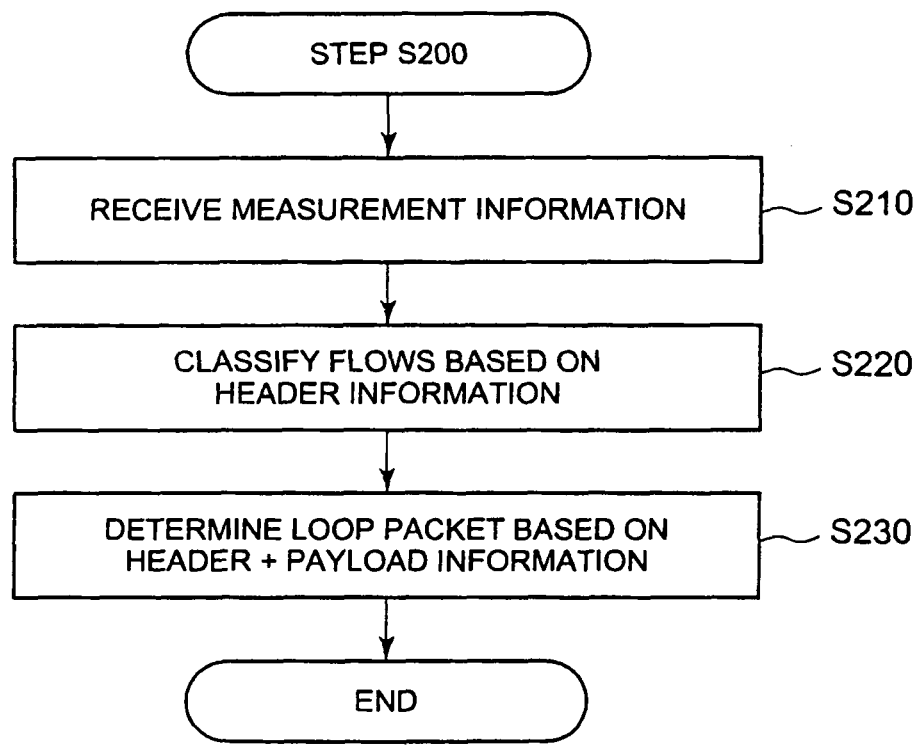
[FIG. 7] It depicts a flowchart showing an example of the processing progress of a loop packet detecting process.
Figure 8:
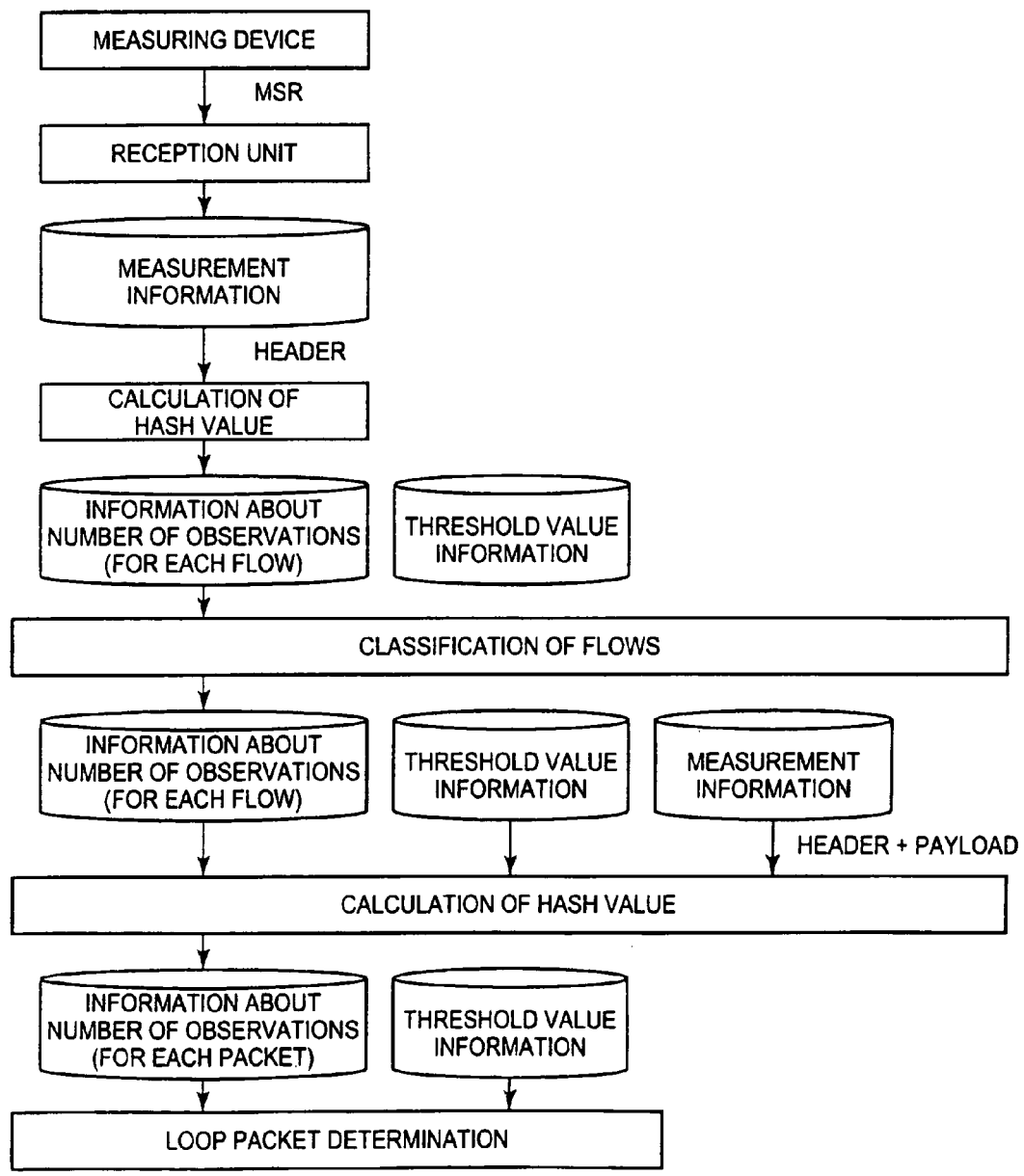
[FIG. 8] It depicts a conceptual diagram typically showing a process conducted by the loop detecting device.

FIG. 7 is a flowchart showing an example of the processing progress of the loop packet detecting process (refer to step S200 in FIG. 2) performed by the loop detecting device 200. FIG. 8 is a conceptual diagram typically showing a process performed by the loop detecting device 200.

The reception unit 210 receives the measurement information MSR transmitted by the measuring device 100 and stores it into the storage device 202 (step S210). The measurement information MSR includes a header and a payload of each packet observed by the measuring device 100. Each header includes a flow identifier (transmitting side MAC address and a receiving side MAC address).

The sorting unit 220 classifies flows of packets each of which becomes a source of the measurement information MSR, based on the measurement information MSR received in step S210 (step S220). The Sorting unit 220 classifies the flows according to the flow identifiers (transmitting side MAC address and receiving side MAC address) in the headers included in the measurement information MSR. However, the sorting unit 220 converts the flow identifiers into hash values and sorts the flows according to the hash values. The sorting unit 220 increments by one a count value of a field corresponding to the hash value into which each flow identifier has been converted in the information about the number of observations for each flow OBFLOW.

Figure 9:
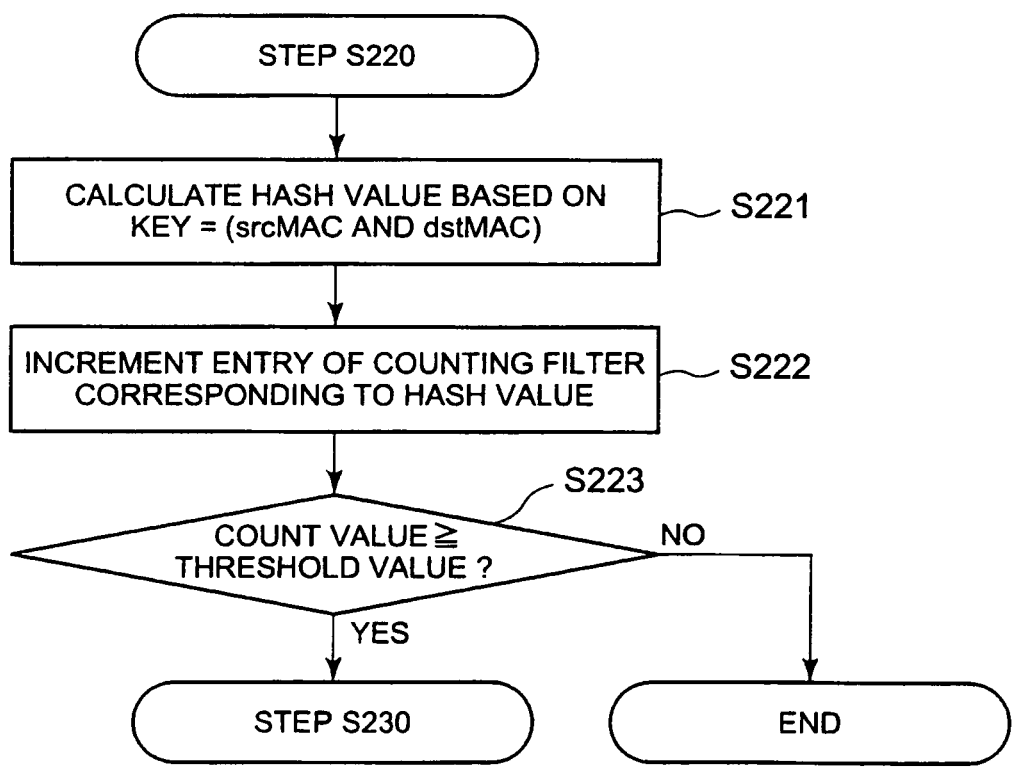
[FIG. 9] It depicts an explanatory diagram illustrating the processing progress of step S220.

FIG. 9 is an explanatory diagram showing the processing progress of step S220. In step S220, the sorting unit 220 calculates a hash value with each flow identifier that is included in the measurement information MSR received in step S210 as a KEY (step S221). In the present example, the sorting unit 220 may substitute the transmitting side MAC address and the receiving side MAC address into a hash function as KEY to thereby calculate the corresponding hash value. Each of SHA-1, MD2 and so on used in general may be used as the hash function, but other hash functions may be used.

Next, the sorting unit 220 increments by one a count value of a field corresponding to the hash value calculated in step S221 in the information about the number of observations for each flow OBFLOW (step S222). This value indicates the observed packet number in each flow indicated by the flow identifier defined as the KEY in step S221. This can also be said to be the number of observations for each flow.

In step S221, the sorting unit 220 may calculate hash values for flow identifiers with respect to a plurality of hash functions respectively. The sorting unit 220 may prepare information about number of observations OBFLOW separately for every hash function and update count values for every hash function in step S222. In this case, count values each corresponding to the kind of each hash function are obtained for each flow identifier. Of the count values, however, the minimum value may be adopted as the observed packet number for each flow. Using the hash functions in this way enables a reduction in the miss of a count due to collision between the hash values. When the amount of calculation and the used amount of memory are more reduced, one hash function may be used.

After step S222, the sorting unit 220 compares the count value updated in step S222 and the candidate specifying threshold value included in the configuration information CONF (step S223). If the count value is greater than or equal to the candidate specifying threshold value (Yes in step S223), the sorting unit 220 causes the detecting unit 230 to start a Process of step S230 (refer to FIG. 7) with respect to a flow identifier corresponding to the count value and a payload extracted from a packet along with the flow identifier. This means that the packet from which the flow identifier corresponding to the count value having reached greater than or equal to the candidate specifying threshold value is extracted is taken as a loop packet candidate. This also means that the flow indicated by the flow identifier is taken as a loop flow candidate. In contrast, if the count value is less than the candidate specifying threshold value (No at Step 223), a process for the flow identifier corresponding to the count value is ended.

The sorting unit 220 executes processes subsequent to step S221 with respect to the respective flow identifiers in the information received from the measuring device 100.

The detecting unit 230 determines whether a loop packet candidate including the flow identifier and the payload corresponds to a loop packet by using the flow identifier corresponding to the count value having reached greater than or equal to the candidate specifying threshold value, and the payload extracted from the packet together with the flow identifier in the information about the number of observations for each flow OBFLOW (step S230). In step S230, the detecting unit 230 converts a set of the flow identifier and the payload into a hash value and increments a count value of a field corresponding to the hash value by one in the information about the number of observations for each packet OBPKT. The detecting unit 230 compares the count value and a loop packet determining threshold value and detects, as a loop packet, a packet including a set of a flow identifier and a payload corresponding to the count value having reached greater than or equal to the loop packet determining threshold value.

Figure 10:
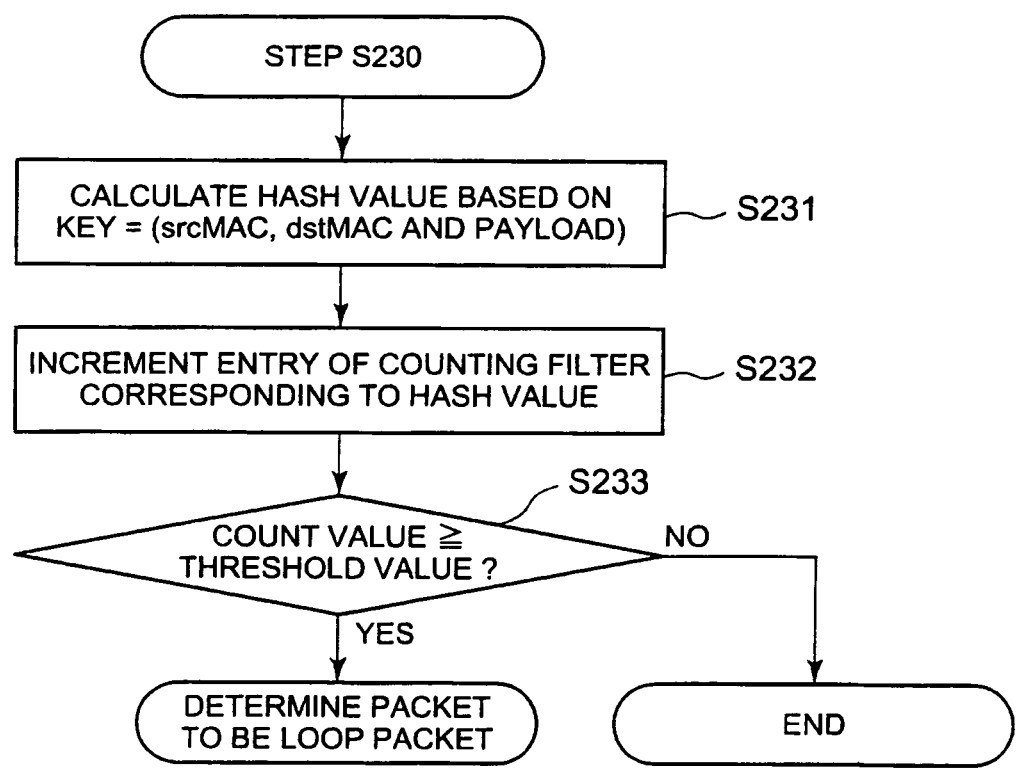
[FIG. 10] It depicts an explanatory diagram showing the processing progress of step S230.

FIG. 10 is an explanatory diagram showing the processing progress of step S230. If the sorting unit 220 has specified the flow identifier corresponding to the count value greater than or equal to the candidate specifying threshold value in step S223 shown in FIG. 9, then the detecting unit 230 then reads, from the measurement information MSR, the flow identifier and the payload extracted from the packet together with the flow identifier. The detecting unit 230 calculates a hash value with the set of the flow identifier and the payload as a KEY (step S231). In the present example, the detecting unit 230 may substitute the transmitting and receiving side MAC addresses and the payload into a hash function as a KEY to thereby calculate the corresponding hash value. Each of SHA-1, MD2 and so on used in general may be used as the hash function, but other hash functions may be used.

Next, the detecting unit 230 increments by one a count value of a field corresponding to the hash value calculated in step S231 in the information about the number of observations for each packet OBPKT (step S232). This value indicates the number of observations of loop packet candidates each including the flow identifier and the payload defined as the KEY in step S231.

In step S231, the detecting unit 230 may calculate hash values corresponding to sets of the flow identifiers and payloads respectively with respect to a plurality of hash functions. The detecting unit 230 may prepare information about number of observations OBPKT separately for every hash function and update count values for every hash function in Step S232. In this case, count values each corresponding to the kind of each hash function are obtained for each set of the flow identifier and the payload. Of the count values, however, the minimum value may be adopted as the number of observed packets. Using the hash functions in this way enables a reduction in the miss of each count due to collision between the hash values. When the amount of calculation and the used amount of memory are more reduced, one hash function may be used.

After step S232, the detecting unit 230 compares the count value updated in step S232 and the loop packet determining threshold value included in the configuration information CONF (step S233). If the count value is greater than or equal to the loop packet determining threshold value (Yes in step S233), the detecting unit 230 determines a loop packet candidate including a set of a flow identifier and a payload corresponding to the count value to be a loop packet. If the count value is less than the loop packet determining threshold value (No in Step S233), the detecting unit 230 terminates a process about the loop packet candidate without detecting the loop packet candidate as the loop packet.

The sorting unit 220 refreshes the information about the number of observations for each flow OBFLOW on a regular basis in a refresh cycle defined by the configuration information CONF. Likewise, the detecting unit 230 also refreshes the information about the number of observations for each packet OBPKT in a cycle defined by the configuration information CONF. Each count value is initialized to 0 by the refresh.

Although the above description has been made of, as an example, the case where the flow identifiers and the payloads are used in step S230, the detecting unit 230 may perform processing using each flow identifier and information about each field that remains unchanged at End-to-End and changes for each packet even in the case of the same flow in step S230. The payload is one example of "information about each field that does not vary at End-to-End and varies for each packet even in the same flow". As other examples of "the information about each field that does not change at End-to-End and changes for each packet even in the same flow", a TCP (Transmission Control Protocol) sequence number, ID field's information, and an RTP (Real-time Transport Protocol) sequence number are also known. In step S230, the flow identifier and the TCP sequence number may be used. The flow identifier and ID field's information may be used. Further, the flow identifier and the RTP sequence number may be used.

That is, the capture unit 110 of the measuring device 100 extracts, from the corresponding packet, information including information about a field that does not change at End-to-End but changes for each packet even in the same flow, and each flow identifier. The measurement information generating unit 120 may include the information about the field and the flow identifier in the measurement information MSR. The detecting unit 230 may perform a process similar to the above step S230 using each flow identifier and "the information about the field that does not change at End-to-End but changes for each packet even in the same flow".

According to the present exemplary embodiment, the sorting unit 220 counts the observed packet number for each flow at the measuring device 100 for every flow identifier and specifies the flow identifier of the flow in which its counted value has reached greater than or equal to the candidate specifying threshold value. The detecting unit 230 counts the number of observed packets at the measuring device 100 for every set of the flow identifier and the payload extracted from the packet along with the flow identifier with only the flow identifier as a target. Then, the detecting unit 230 detects the packet including the set of the payload and flow identifier of the flow in which its counted value has reached greater than or equal to the loop packet determining threshold value, as the loop packet. Thus, the sorting unit 220 may screen each packet and count the number of observed packets for every set of the flow identifier and the payload with respect to only the screened packet (loop packet candidate). It is therefore possible to suppress the amount of calculation and the used amount of memory used for loop packet detecting.

When the flow identifier and the set of the flow identifier and the payload are compared with each other, data volume increases at the latter. Thus, the amount of calculation and the used amount of memory increase where all packets each of which becomes the source of the measurement information MSR are classified for each set of the flow identifiers and payloads and the number of observations is counted. Since the kind of the sets of the flow identifiers and the payloads increases, the probability of collision between the hash values also increases upon calculation of each hash value. In the present invention, the targets which are classified for each set of flow identifiers and payloads and whose number of observations is counted are narrowed down by screening of the sorting unit 220. It is therefore possible to suppress processing loads. It is also possible to prevent an increase in the probability of collision between the hash values.

Although the above exemplary embodiment has explained, as an example, the case where the loop detecting system detects each loop packet, it may detect each loop flow. Even in the case of the detection of the loop flow, the operation of the measuring device 100 is similar to the above operation. If there exists a count value of the information about the number of observations OBPKT, which has reached greater than or equal to the loop packet determining threshold value in step S233, the detecting unit 230 of the loop detecting device 200 may specify a set of a flow identifier and a payload corresponding to the count value and determine a flow specified by the flow identifier to be a loop flow. Other operations are similar to that of the above exemplary embodiment. Detecting the loop flow also yields the effect of suppressing processing loads.

As a modification of the first exemplary embodiment, an exemplary embodiment will next be explained in which the measuring device 100 generates measurement information MSR in such a manner that it includes each flow identifier and a TTL of each packet, and the loop detecting device 200 detects a loop flow by referring to the measurement information MSR. Incidentally, the description of processing similar to that of the first exemplary embodiment will be omitted. In the present modification, the loop flow is targeted for detecting. Even in the present modification, the measuring device 100 and the loop detecting device 200 respectively include such components as illustrated in FIGS. 3 and 4.

The TTL is a parameter stored in each packet. An initial value is set at the transmission source of the packet. The parameter is decremented one by one by the switches 300 (refer to FIG. 1) each time the parameter passes through the switches 300. Incidentally, the number of bytes of each TTL is one byte.

Even in the present modification, the measuring device 100 includes the components illustrated in FIG. 3 and generates measurement information MSR. The capture unit 110 (refer to FIG. 3) of the measuring device 100 extracts information including flow identifiers and TTL from each packet that passes through the measuring device 100. The measurement information generating unit 120 performs format conversion on the information extracted by the capture unit 110 to generate measurement information MSR. The measurement information generating unit 120 transmits the measurement information MSR including the flow identifier and TTL to the loop detecting device 200.

Even in the present modification as well, the loop detecting device 200 includes the components illustrated in FIG. 4. The storage device 202, however, stores therein information about the number of observations for each TTL in each flow instead of information about the number of observations for each packet OBPKT. This information will hereinafter be described as TTL number-of-observations information. For example, a counting filter is used even in a data structure of the TTL number-of-observations information. The number of observations for each TTL is counted with respect to the individual flows. Thus, in the present modification, the counting filters are each held every flow.

The configuration information CONF includes a loop flow determining threshold value compared with each count value of TTL included in the TTL number-of-observations information instead of the loop packet determining threshold value.

The reception unit 210 and the sorting unit 220 of the loop detecting device 200 are similar to those in the first exemplary embodiment and carry out steps S210 and S220 (specifically, steps S221 to S223 shown in FIG. 9) shown in FIG. 7.

If the updated count value is greater than or equal to the candidate specifying threshold value in step S223 (refer to FIG. 9), the sorting unit 220 updates the number of observations of TTL detected together with a flow identifier corresponding to the count value with respect to the flow identifier and causes the detecting unit 230 to start a process (loop flow determination process) for determining whether the flow indicated by the flow identifier is a loop flow. Thus, in the present modification, the detecting unit 230 performs the loop flow determination process instead of step S230 shown in FIG. 7.

Figure 11:
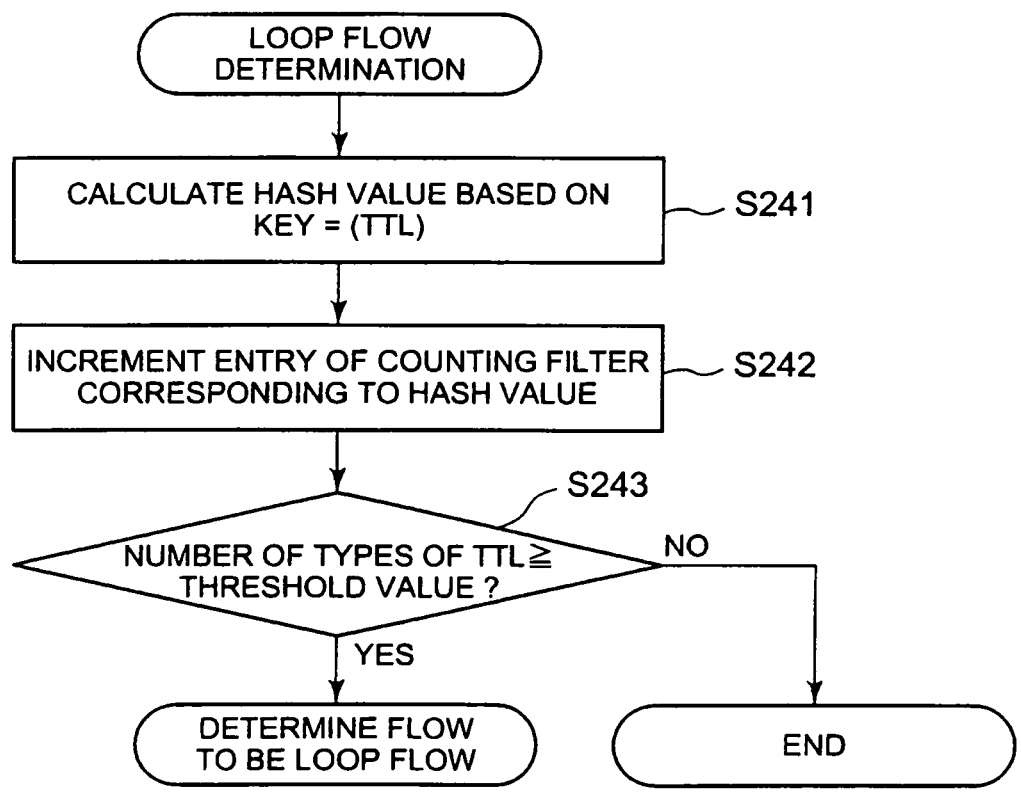
[FIG. 11] It depicts a flowchart illustrating the processing progress of a loop flow determination process.

FIG. 11 is a flowchart showing the processing progress of the loop flow determination process. If the sorting unit 220 has specified the flow identifier corresponding to the count value greater than or equal to the candidate specifying threshold value in step S223 shown in FIG. 9, the detecting unit 230 reads, from the corresponding measurement information MSR, each TTL extracted from each packet together with the flow identifier. Incidentally, this flow identifier is described as "a focused flow identifier". The detecting unit calculates a hash value with the read TTL as a KEY (step S241). The detecting unit 230 may substitute the TTL into its corresponding hash function as the KEY to thereby calculate a hash value of the TTL.

Next, the detecting unit 230 increments by one, a count value corresponding to the hash value calculated in step S241, of count values of individual TTL relating to the focused flow identifier in the TTL number-of-observations information (step S242). That is, in the flow indicated by the focused flow identifier, the number of observations of the TTL read from the measurement information MSR in step S241 is incremented by one.

The initial value of the count value corresponding to the hash value of TTL is 0. When the TTL is observed, the count value related to the TTL is incremented by one. Thus, of individual TTL concerning the focused flow identifier, the TTL in which the count value has reached greater than or equal to 1, is an observed TTL. The detecting unit 230 compares the number of fields (number of types of the observed TTL) in which the count value has reached greater than or equal to 1, and the loop flow determining threshold value with respect to the focused flow identifier (step S243). If the number of the types of the observed TTL is greater than the loop flow determining threshold value (Yes in step S243), the detecting unit 230 determines the flow indicated by the focused flow identifier to be a loop flow. If the number of the types of TTL observed is less than the loop flow determining threshold value (No in step S243), the detecting unit 230 terminates processing related to the focused flow identifier without detecting the loop flow.

Generally, a path from a transmission source to a transmission destination does not vary frequently in a network. For this reason, each packet in the same flow, of packets that pass through the measuring device 100 disposed in the network, is considered to have passed through the same path. The probability is high that TTL of each packet will be the same value.

However, the packet of the loop flow passes through the measuring device 100 and circulates in the network. The packet repeatedly passes through the measuring device 100. Even in the same packet, a TTL having reached the measuring device 100 is different from the TTL that has reached the measuring device 100 at a previous time. Thus, if the kind of observed TTL increases with respect to a focused flow, the flow can be determined to be a loop flow. In the present modification, the loop flow is detected using such a determination.

Even in the present modification as well, processing loads can be reduced to detect each loop flow in a manner similar to the first exemplary embodiment.

Although the above modification has explained, as an example, the case where the TTL are used in steps S241 to S243, the detecting unit 230 may perform the processing of steps S241 to S243 using information about each field that changes each time the packet is transferred. The TTL is one example of "the information about each field that changes each time the packet is transferred".

Namely, the capture unit 110 of the measuring device 100 extracts information including information about each field that varies each time the packet is transferred, and a flow identifier from the corresponding packet. The measurement information generating unit 120 may include the field information and the flow identifier in the measurement information MSR. And the detecting unit 230 may perform processing similar to those of steps S241 to S243 using the flow identifier and "the information about each field that changes each time the packet is transferred".

As an example of "the information about each field that changes each time the packet is transferred", there is mentioned information at an InputPort in addition to the TTL. Thus, the detecting unit 230 may perform the processing of steps 241 to S243 using the InputPort information.

Second Exemplary Embodiment

The present invention applicable even to a network system in which a given control device (not shown) controls packet transfer devices (e.g., switches 300 shown in FIG. 1) on a network in a concentrated manner. The second exemplary embodiment is an exemplary embodiment achieved in such a network system. Incidentally, the network system is not limited in particular if the control device is of such an exemplary embodiment that it controls the respective packet transfer devices (switches 300 shown in FIG. 1). An openflow technique will however be explained herein by way of example.

An openflow takes communications as an end-to-end flow. Path control, a failure recovery, load sharing and optimization are achieved in flow units. Openflow switches each of which functions as a packet transfer device perform communications via a control device (openflow controller) and secure channels. The openflow switch holds a flow table in which classification information, action and flow statistic information are defined for each flow. The classification information is information which is checked against the header of each packet and used for determining whether the packet is a packet for a flow corresponding to the classification information. The action is information which defines the contents of processing relative to a packet for a flow corresponding to its action information.

When the packet is received, the openflow switch checks the packet against classification information at each entry in the flow table and determines to which flow the packet belongs. And a process defined by action of the flow is performed on the packet. For example, the packet is transferred to its corresponding openflow switch defined by action.

When it is not possible to specify the flow for the packet even if the check against each entry in the flow table is done, the openflow switch transmits the packet to its corresponding openflow controller via the security channel and requires the determination of classification information and action corresponding to the flow for the packet. Incidentally, the packet at which the flow cannot be specified even if the check against each entry in the flow table is done, is referred to as "a First Packet". The openflow controller determines, for example, a path for the first packet according to this request and sets classification information and action for a new flow for each openflow switch on the path. With this setting, each openflow switch on the path is able to sequentially transfer a new packet along the determined path.

A loop detecting system of the second exemplary embodiment is also equipped with the measuring device 100 and the loop detecting device 200 as shown in FIG. 1. The following description will be made of, as an example, the case where each switch 300 shown in FIG. 1 is an openflow switch. The openflow switch will be described below simply as a switch.

In the openflow, the flow may be defined by freely combining the following parameters. That is, a flow identifier may be defined by freely combining an input port (Ingress Port), a MAC DA (MAC destination address, i.e., receiving side MAC address), a MAC SA (MAC source address, i.e., transmitting side MAC address), Ethernet (registered trademark) type (TPID), a VLAN ID (Virtual LAN ID), a VLAN TYPE (priority), an IP SA (IP source address), an IP DA (IP destination address), an IP protocol, a source port (TCP/UDP (User Datagram Protocol) Source Port), an ICMP (Internet Control Message Protocol) Type, and a destination port (TCP/UDP Destination Port), or ICMP Codes. A description will be made herein of, as an example, the case where a set of the transmitting side MAC address and the receiving side MAC address is assumed to be a flow identifier. A combination of other parameters may however be assumed to be a flow identifier.

The measuring device 100 (refer to FIG. 1) is disposed between the switches 300 and extracts information from each packet transmitted/received between the switches 300. The measuring device 100 is achieved by a router, for example. The loop detecting device 200 detects a loop packet or a loop flow, based on the information extracted by the measuring device 100. The loop detecting device 200 is achieved by a server computer, for example. These points are similar to the first exemplary embodiment or the modification thereof. In the second exemplary embodiment, in addition to the process of detecting the loop packet or the loop flow, the loop detecting device 200 instructs the measuring device 100 to delete the loop packet, and the measuring device 100 deletes the detected loop packet or a packet having a flow identifier for the detected loop flow, in accordance with the above instructions.

The loop detecting device 200 may be connected to a plurality of measuring devices 100. In such a case, the loop detecting device 200 performs processing for each measuring device 100. The loop detecting device 200 and the measuring device 100 may be achieved by the same device. The loop detecting device 200 may be achieved by the same device as the openflow controller (not shown).

As described in the first exemplary embodiment, the measuring device 100 extracts information including flow identifiers and payloads from each packet and generates measurement information MSR including the flow identifiers and the payloads. For ease of explanation, the following description will be made of, as an example, the case where the loop detecting device 200 detects a loop packet.

Figure 12:
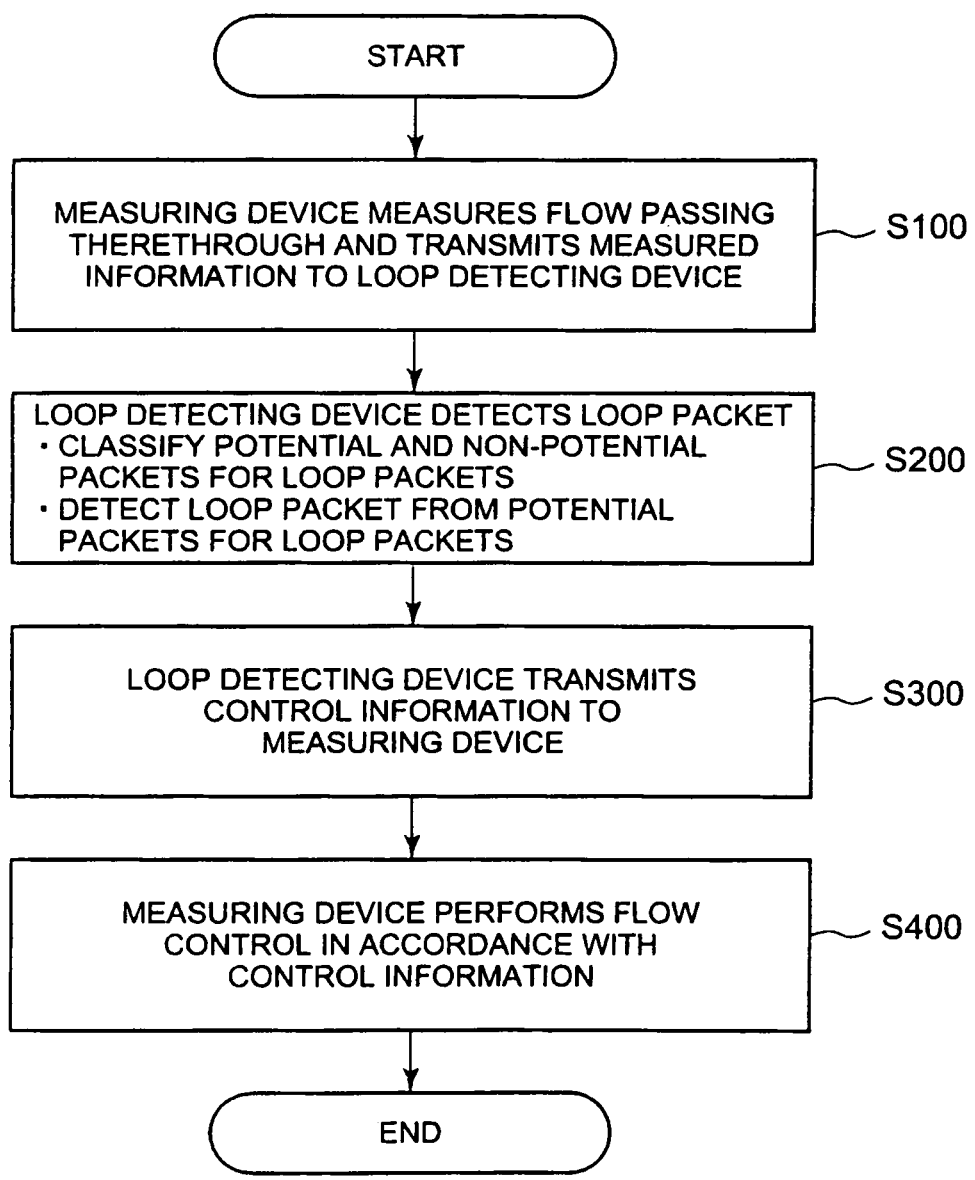
[FIG. 12] It depicts a flowchart showing operation according to a second exemplary embodiment.

FIG. 12 is a flowchart showing operation according to the second exemplary embodiment. The same reference numerals as those in FIG. 2 are respectively attached to processes similar to those in the first exemplary embodiment, and their detailed explanations are omitted.

The measuring device 100 extracts information including flow identifiers and payloads from a packet that passes therethrough and performs format conversion of the information to thereby generate measurement information MSR. The measuring device 100 periodically transmits the measurement information MSR to the loop detecting device 100 (step S100).

The loop detecting device 200 refers to the measurement information MSR and specifies a potential packet (loop packet candidate) for a loop packet. The loop detecting device 200 determines, using the flow identifier and the payload, whether the packet is a loop packet, with the loop packet candidate as a target (step S200).

The operations of steps S100 and S200 are similar to those in the first exemplary embodiment. It is thus possible to suppress increases in the used amount of memory and the amount of calculation during the loop packet is specified.

In the second exemplary embodiment, the loop detecting device 200 generates control information for defining a process for each loop packet and transmits the control information to the measuring device 100 (step S300). The process for the loop packet is, in particular, a discarding process. For example, the loop detecting device 200 designates a flow identifier for a loop packet, generates control information to discard the packet including the flow identifier and transmits it to the measuring information 100.

The loop detecting device 200 may hold path information for each flow (which is described as PAT) and specify a switch 300 through which the loop packet passes, from the flow identifier for the loop packet and the path information PAT in step S300. And the loop detecting device 200 may transmit control information to each switch on a path through which each loop packet passes.

The measuring device 100 having received the control information therein discards a packet that matches a condition defined in the control information out of the packets that pass therethrough (step S400). When, for example, the packet including the flow identifier defined in the control information reaches the measuring device 100, the measuring device 100 discards the packet.

In step S300, when the loop detecting device 200 has transmitted the control information to the respective switches 300 through which the loop packets pass, the respective switches 300 also discard packets each of which matches the condition defined in the control information, out of the packets transferred to the switches.

Thus, when the loop detecting device 200 has detected the corresponding loop packet, the loop detecting device 200 controls the measuring device 100 or each switch 300 in such a manner that it discards the loop packet. The measuring device 100 and the switch 300 discard the loop packet in accordance with its control. Thus, the second exemplary embodiment can also obtain the effect of being capable of discarding each loop packet staying within the network and effectively using network resources in addition to the effect of the first exemplary embodiment.

In a network to which no openflow is applied, flow control is performed at a port level, for example. Therefore, when one of a plurality of flows is detected as a loop flow where the flows pass through one port, for example, the port may be blocked off even if each flow other than the loop flow passes through the port. In contrast, when the present invention is applied to the openflow network, control for each flow is enabled. Therefore, even in such a case as described above, there is no need to perform blocking for each port, and resources can effectively be used.

Configuration and operation examples of the respective devices will be explained in detail below.

Figure 13:
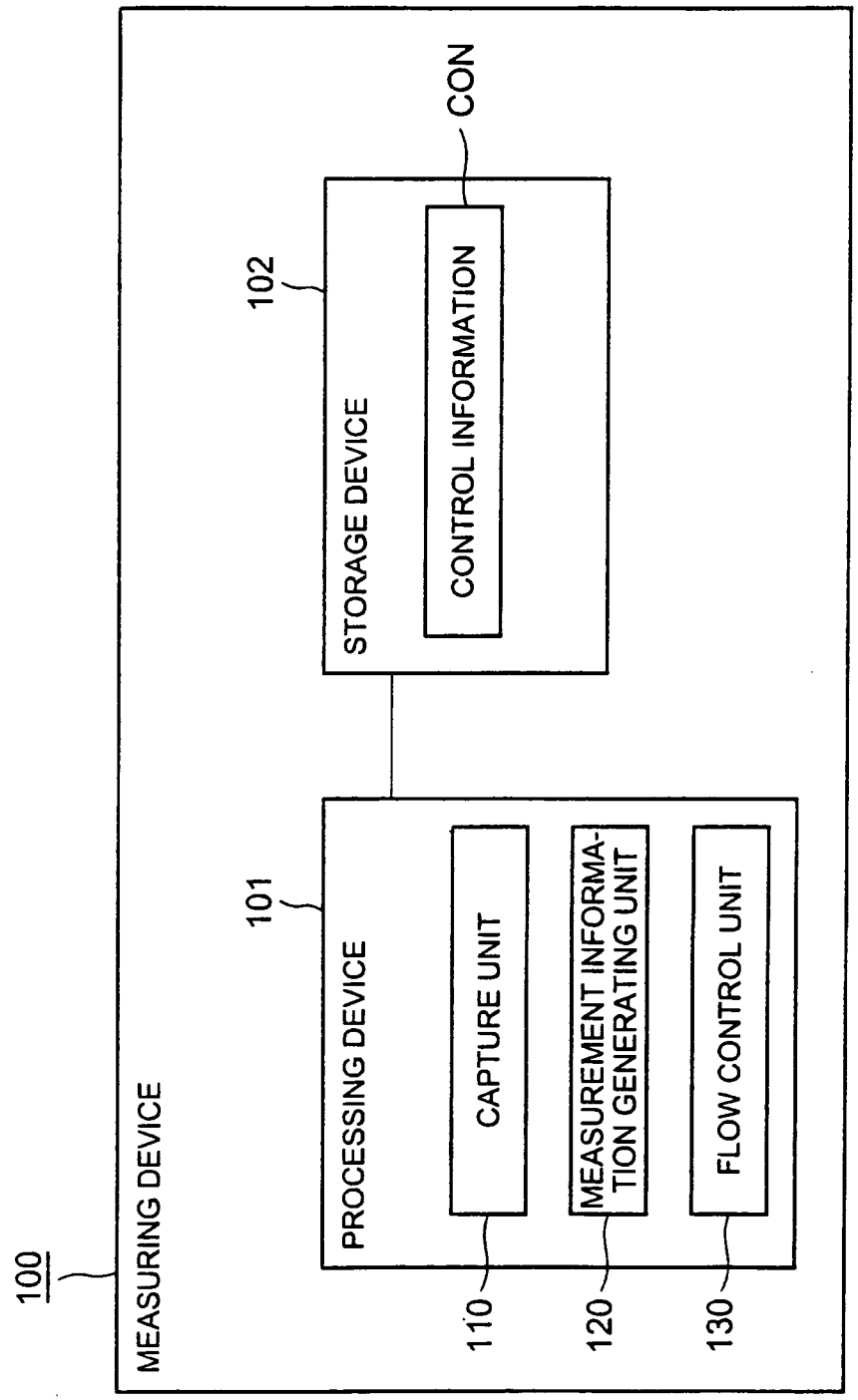
[FIG. 13] It depicts a block diagram showing a configuration example of a measuring device according to the second exemplary embodiment.

FIG. 13 is a block diagram showing the configuration example of the measuring device 100 according to the second exemplary embodiment. The measuring device 100 according to the second exemplary embodiment is equipped with a processing device 101 and a storage device 102 that stores control information CON therein. The storage device 102 stores the control information CON received from the loop detecting device 200. The control information CON includes a condition (e.g., a flow identifier for each loop packet) for identifying each loop packet, and instructions for action relative to each packet that matches the condition. Although the following description will be made of, as an example, the case where the contents of action means the discarding of each packet, the contents of instructions for control on the packet is not limited to its discard. For example, the control information CON may be one for giving instructions for QoS (Quality of Service) control to each packet that conforms to the condition. Further, for example, the control information CON may be one for giving instructions for bandwidth control to each packet that matches the condition.

In the second exemplary embodiment, the processing device 101 is provided with a capture unit 110, a measurement information generating unit 120, and a flow control unit 130. The capture unit 110 and the measurement information generating unit 120 are similar to those in the first exemplary embodiment, and the description thereof is omitted.

The flow control unit 130 receives the control information CON transmitted by the loop detecting device 200 therein and causes the storage device 102 to store the same. The flow control unit 130 determines whether each packet that passes through the measuring device 100 matches the condition included in the control information CON. If the packet matches the condition, the packet is discarded in accordance with the control information CON. If it does not match the condition, the flow control unit 130 allows the packet to pass therethrough.

The capture unit 110, the measurement information generating unit 120 and the flow control unit 130 are achieved by a CPU of a computer operated in accordance with a program, for example.

A flow measuring function (capture unit 110 and measurement information generating unit 120) and a flow control function (flow control unit 130) are not required to be achieved by one device. They may be achieved by discrete devices respectively. For example, the flow measuring function may be achieved by a probe, and the flow control function may be achieved by a router. In this case, a combination of the probe and the router corresponds to the measuring device 100.

Incidentally, in such a form that each of the switches also receives control information therein, and the packet is discarded in accordance with the control information, each switch is also provided with the flow control unit 130 and the storage device 102 mentioned above.

Figure 14:
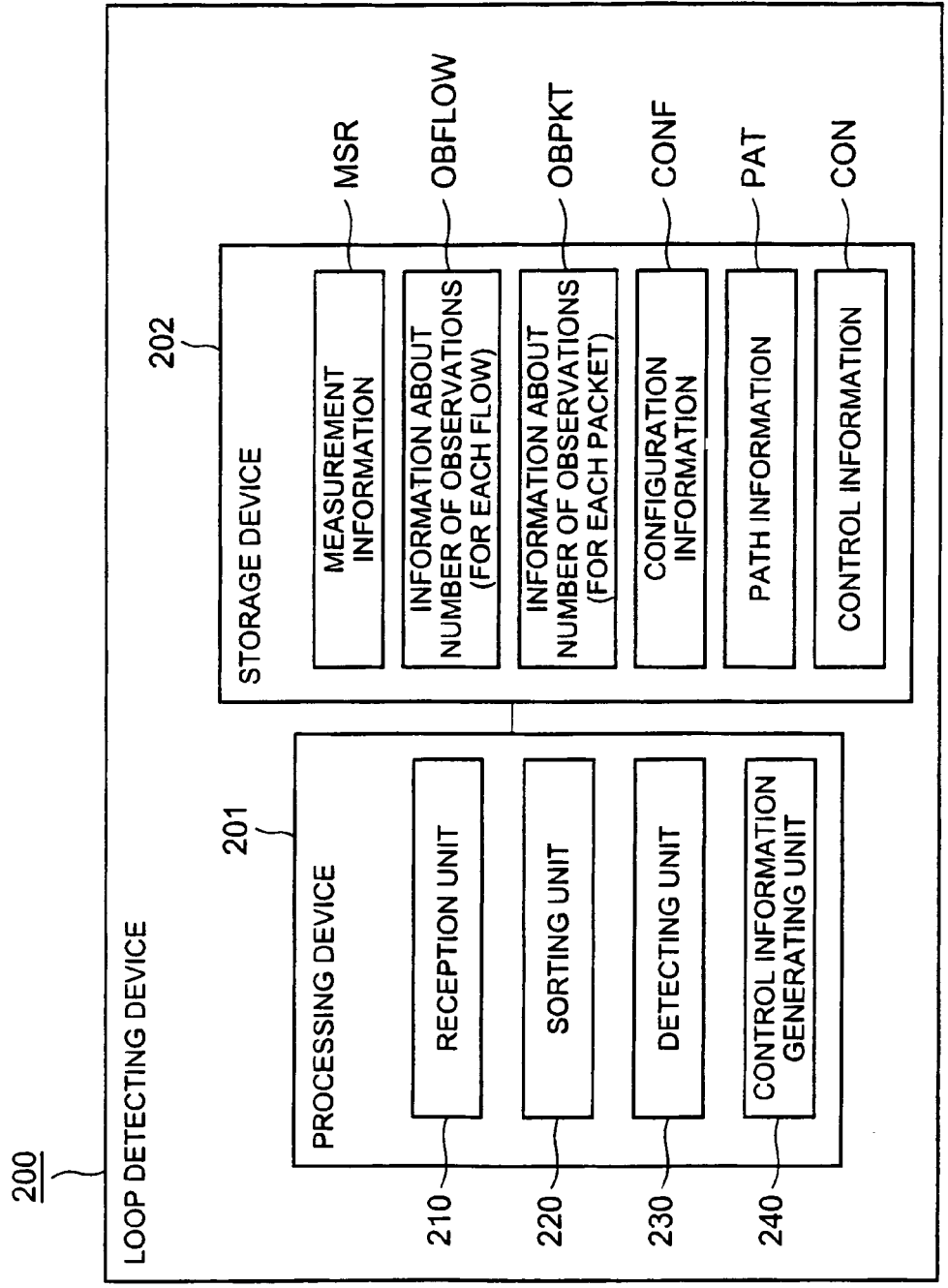
[FIG. 14] It depicts a block diagram showing a configuration example of a loop detecting device according to the second exemplary embodiment.

FIG. 14 is a block diagram showing the configuration example of the loop detecting device 200 according to the second exemplary embodiment. The same reference numerals as those in FIG. 4 are respectively attached to components similar to those in the first exemplary embodiment, and the description thereof is omitted. The loop detecting device 200 is provided with a processing device 201 and a storage device 202.

The processing device 201 is equipped with a reception unit 210, a sorting unit 220, a detecting unit 230, and a control information generating unit 240. The reception unit 210, the sorting unit 220 and the detecting unit 230 are similar to those in the first exemplary embodiment.

When the detecting unit 230 makes a decision as to a loop packet, the control information generating unit 240 generates control information CON including a condition for identifying the loop packet and instructions to discard a packet that matches the condition. The control information generating unit 240 may include a flow identifier for each flow including a loop packet in the control information CON as the condition for identifying the loop packet. Further, each payload as well as the flow identifier may be included in the control information CON as the condition for identifying the loop packet.

The control information generating unit 240 transmits the generated control information CON to the measuring device 100. The control information generating unit 240 may cause the storage device 202 to store the control information CON therein.

The control information generating unit 240 may specify a path for each flow indicated by the flow identifier of the loop packet and transmit the control information CON to each switch 300 on the path. Alternatively, the control information generating unit 240 may transmit the control information CON to each individually-selected switch of the switches on the specified path. The control information CON may be transmitted only to the switch at the entrance of the network, of the switches on the path, for example.

The reception unit 210, the sorting unit 220, the detecting unit 230 and the control information generating unit 240 are achieved by a CPU of a computer operated in accordance with a loop detecting program, for example. In this case, the CPU may operate as the reception unit 210, the sorting unit 220, the detecting unit 230 and the control information generating unit 240 in accordance with the loop detecting program. The reception unit 210, the sorting unit 220, the detecting unit 230 and the control information generating unit 240 may be achieved by discrete units.

In a manner similar to the first exemplary embodiment, the storage device 202 stores therein measurement information MSR, information about the number of observations for each flow OBFLOW, information about the number of observations for each packet OBKT, and configuration information CONF. In the second exemplary embodiment, the storage device 202 may further store the path information PAT and the control information CON therein.

Figures 15, 16:
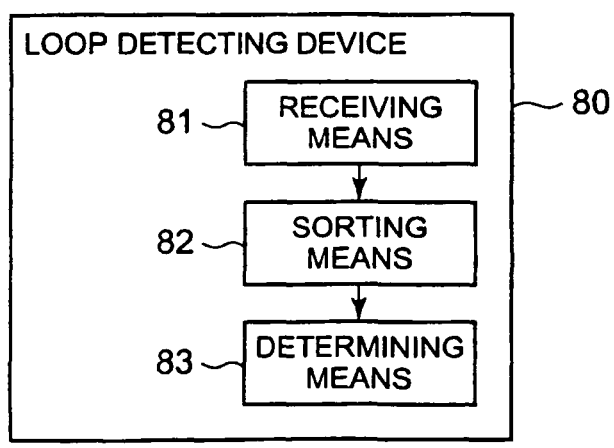
[FIG. 15] It depicts an explanatory diagram conceptually illustrating one example of path information.
[FIG. 16] It depicts an explanatory diagram showing an example of a minimum configuration of the loop detecting device of the present invention.

The path information PAT is information indicative of a path for each flow. FIG. 15 is an explanatory diagram conceptually showing one example of the path information PAT. As shown in FIG. 15, the path information PAT makes flow identifiers correspond to information indicative of a link on each path for each flow. In the example shown in FIG. 15, whether the information corresponds to the link on the path is expressed in "1" or "0" for each link as the information indicative of each link on the path. When the information corresponds to the link on the path, it is described as "1". When the information does not corresponds to the link on the path, it is described as "0". Incidentally, the example shown in FIG. 15 illustrates the case in which a transmitting side IP address and a receiving side IP address are used as flow identifiers. It is however preferable to use, as the flow identifiers, the flow identifiers used in the processing by the loop detecting device 200. Each link may be identified by a combination of identification information about switches at both ends of the link.

The loop detecting device 200 may receive the path information PAT from, for example, an openflow controller (not shown) and store it in the storage device 202. When the openflow controller receives a first packet from the corresponding switch and determines a path for a flow of the first packet, the openflow controller may make flow identifier for the flow correspond to the path and transmit information thereof to the loop detecting device 200. The loop detecting device 200 may receive the information therein and store it in the storage device 202 as path information PAT.

When the loop detecting device 200 and the openflow controller are achieved by the same device, and the loop detecting device 200 operates even as the openflow controller, the loop detecting device 200 may receive the first packet from the corresponding switch, make a flow identifier for a flow of the first packet correspond to a path for the flow when the path for the flow of the first packet is determined, and cause the storage device 202 to store the same therein as path information PAT.

The operation of the second exemplary embodiment will be explained in detail with reference to FIGS. 12, 13 and 14. The operations of steps S100 and S200 shown in FIG. 12 are however similar to those in the first exemplary embodiment, and the description thereof is omitted steps S300 and S400 subsequent to the detection of the loop packet in step S200 will be explained herein.

When the detecting unit 230 detects a loop packet, the control information generating unit 240 creates control information CON including each flow identifier for the flow of the loop packet as a condition for identifying the loop packet. As the condition for identifying the loop packet, the control information generating unit 240 may generate control information CON including not only flow identifiers but also payloads. The flow identifier and the payload specifically correspond to a count value counted up to a level greater than or equal to a loop packet determining threshold value in information about the number of observations for each packet. The control information generating unit 240 causes the control information to include even information to give instructions for discarding each packet that has matched the condition. The control information generating unit 240 transmits the created control information CON to the measuring device 100 (step S300). The control information generating unit 240 may transmit the control information to the measuring device 100 in accordance with the already-existing communication protocol such as TCP, UDP or the like.

The control information generating unit 240 may specify each switch on the path corresponding to the flow identifier of the loop packet, of the switches lying within the openflow network by referring to the path information PAT, and transmit the control information to each switch. Further, the control information generating unit 240 may transmit the control information only to each individually-selected switch (switch at the entrance of the network, for example) of the switches on the path.

When the flow control unit 130 (refer to FIG. 13) of the measuring device 100 receives the control information CON from the loop detecting device 200, the flow control unit 130 causes the storage device 102 to store the control information CON therein. And the flow control unit 130 processes each packet passing through the measuring device 100 in accordance with the control information CON. That is, the flow control unit 130 checks the condition (e.g., each flow identifier) included in the control information CON against each packet having reached the measuring device 100. If the packet matches the condition, the flow control unit 130 discards the packet in accordance with the control information CON. Since the packet meeting the condition is of each loop flow, each packet that continues to stay within the network is discarded. Incidentally, as already described, the condition included in the control information CON may be a combination of the flow identifier and the payload.

Although the above description has been made of, as an example, the case where the detecting unit 230 of the loop detecting device 200 detects the loop packet, the detecting unit 230 of the loop detecting device 200 may detect the loop flow as described in the first exemplary embodiment. The operations of steps S300 and S400 in this case are similar to the operation of detecting the loop packet by the detecting unit 230. Even in this case, the control information generating unit 240 may include each flow identifier for the loop flow in the control information.

The second exemplary embodiment has also explained, as an example, the case where each payload is used when the loop packet or the loop flow is specified. As described in the first exemplary embodiment, when the loop packet or the loop flow is specified, the loop detecting device 200 may perform processing using each flow identifier and information about each field that does not change at End-to-End and changes for each packet even in the same flow. The payload is one example of such field information. As other examples of "the information about each field that does not change at End-to-End and changes for each packet even in the same flow", a TCP sequence number, ID field's information, and an RTP sequence number are also known. Thus, the loop detecting device 200 may use these information.

In a manner similar to the modification of the first exemplary embodiment, the measuring device 100 may generate measurement information MSR in such a manner that it includes each flow identifier and packet's TTL. The loop detecting device 200 may detect the corresponding loop flow using the TTL. In this case, the operation in which the measuring device 100 creates the measurement information MSR in such a manner that it includes the flow identifiers and the packet's TTL is similar to that of the modification of the first exemplary embodiment. The operation of detecting the loop flow using the TTL by the detecting unit 230 is also similar to that of the modification of the first exemplary embodiment. That is, in step S200, the reception unit 210 performs the process of step S210 (refer to FIG. 7), and the sorting unit 220 performs the process of step S220 (refer to FIG. 7, and more specifically, steps S221 to S223 shown in FIG. 9). The detecting unit 230 may perform the processes of steps S241 to S243 shown in FIG. 11. Incidentally, since the loop flow is detected in this, case, the control information generating unit 240 includes a flow identifier for the loop flow in the control information as a condition for identifying each loop packet in step S300 (refer to FIG. 12). Other points are similar to the already-described operation of the second exemplary embodiment.

As described in the modification of the first exemplary embodiment, the information used in steps S241 to S243 is not limited to the TTL but may be "information about each field that changes each time the packet is transferred". As an example of such information, there may be mentioned information for an input port in addition to the TTL.

In the respective exemplary embodiments and their modifications, the loop packet candidate was specified using the flow identifier extracted from the packet, and the loop packet or the loop flow was specified using the payload or TTL extracted from the packet. The information used to specify the loop packet candidate may be information other than the flow identifier. The information used to specify the loop packet or the loop flow may not be the payload or the like.

For example, the sorting unit 220 may classify the packets using the payloads extracted from the packet and specify the corresponding loop packet candidate. And the detecting unit 230 may detect the loop packet or the loop flow using the flow identifier or TTL extracted from the packet. In this case, the measuring device 100 may generate measurement information MSR including payloads and TTL and transmit the same to the loop detecting device 200. Alternatively, the measuring device 100 may create measurement information MSR including payloads and flow identifiers and transmit the same to the loop detecting device 200.

Incidentally, the TTL mentioned in the above description is not limited to the TTL in the IP header but may be a TTL in an MPLS (Multiprotocol Label Switching) shim header.

Figure 17:
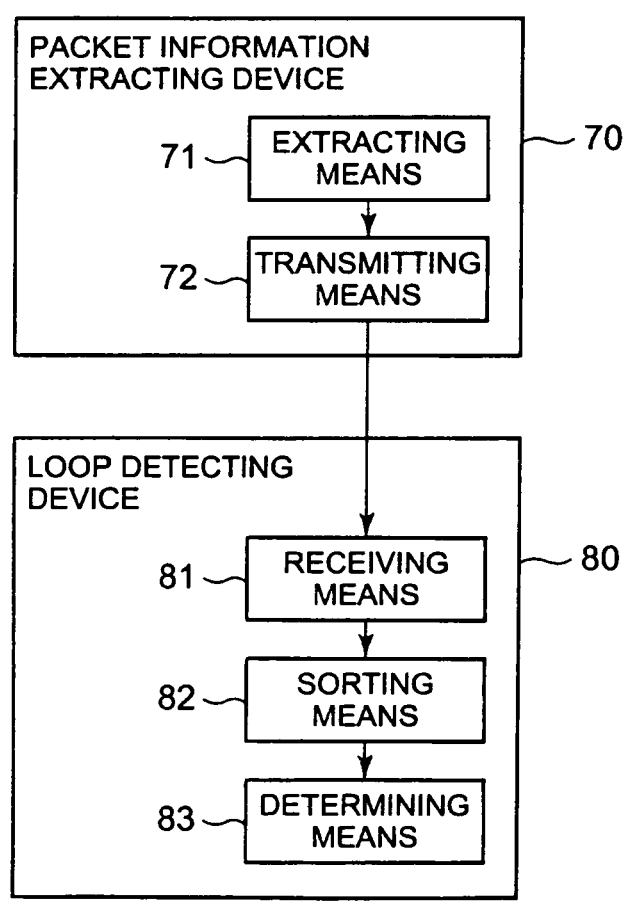
[FIG. 17] It depicts an explanatory diagram showing an example of a minimum configuration of the loop detecting system of the present invention.

The minimum configuration of the present invention will next be explained. FIG. 16 is an explanatory diagram showing an example of a minimum configuration of the loop detecting device of the present invention. FIG. 17 is an explanatory diagram showing an example of a minimum configuration of the loop detecting system of the present invention.

The loop detecting system of the present invention is equipped with a packet information extracting device 70 and a loop detecting device 80 (refer to FIG. 17). The packet information extracting device 70 (e.g., measuring device 100) extracts information from each packet transmitted and received between packet transfer devices (e.g., switches 300). The loop detecting device 80 (e.g., loop detecting device 200) detects a loop packet or a loop flow using the information extracted by the packet information extracting device 70.

The packet information extracting device 70 includes an extracting means 71 and a transmitting means 72. The extracting means 71 (e.g., capture unit 110) extracts from a packet passing through the packet information extracting device 70, packet information (e.g., information about a packet's header of 128 bytes) including first predetermined information (e.g., flow identifier) in the packet and second predetermined information (e.g., payload or TTL) in the packet. The transmitting means 72 (e.g., measurement information generating unit 120) transmits the packet information to the loop detecting device 80.

The loop detecting device 80 (refer to FIGS. 16 and 17) of the present invention includes a receiving means 81, a sorting means 82 and a determining means 83. The receiving means 81 (e.g., reception unit 210) receives the packet information from the packet information extracting device.

The sorting means 82 (e.g., sorting unit 220) classifies the packets from each of which the information is extracted by the packet information extracting device, based on the first predetermined information included in the packet information, counts the number of the classified packets for every first predetermined information, and specifies first predetermined information in which a count result reaches greater than or equal to a first threshold value (e.g., candidate specifying threshold value).

The determining means 83 (e.g., detecting unit 230) determines whether each packet having the first predetermined information specified by the sorting means 82 is a loop packet or whether each flow specified by the first predetermined information is a loop flow by using the second predetermined information included in the packet information received by the receiving means 81 with the first predetermined information specified by the sorting means 82 as a target.

With such a configuration, the loop packet or the loop flow can be specified. Since the sorting means 82 narrows down the first predetermined information, and the determining means 83 performs processing with the narrowed-down first predetermined information as a target, a processing load in the process of specifying the loop packet or the loop flow can be reduced.

Any or all of the above exemplary embodiments can be described like the following supplementary notes but are not limited to the following.

(Supplementary Note 1)

A loop detecting device includes: receiving means which receives from a packet information extracting device for extracting information from each packet transmitted and received between packet transfer devices, packet information including first predetermined information and second predetermined information in the packet; sorting means which classifies the packets from each of which information is extracted by the packet information extracting device, based on the first predetermined information included in the packet information, counts the number of the classified packets for each first predetermined information, and specifies first predetermined information in which a count result reaches greater than or equal to a first threshold value; and determining means which determines whether each packet having the first predetermined information specified by the sorting means is a loop packet or whether each flow specified by the first predetermined information is a loop flow by using the second predetermined information included in the packet information received by the receiving means with the first predetermined information specified by the sorting means as a target.

(Supplementary Note 2)

In the loop detecting device described in the Supplementary note 1, the receiving means receives packet information including a flow identifier for identifying a flow of each packet as the first predetermined information and, as the second predetermined information, information about each field that does not change at an end-to-end and changes for each packet even in the same flow.

(Supplementary Note 3)

In the loop detecting device described in the Supplementary note 1 or 2, the receiving means receives Packet information including a flow identifier for identifying a flow of each packet as the first predetermined information and, as the second predetermined information, any of at least a packet payload, a TCP sequence number, information about an ID field, and an RTP sequence number.

(Supplementary Note 4)

In the loop detecting device described in the Supplementary note 2 or 3, the determining means classifies packets each having a flow identifier specified by the sorting means, based on a set of the flow identifier and the second predetermined information, counts the number of the classified packets for each set of the flow identifier and the second predetermined information, and compares a count result and a second threshold value to thereby determine whether a packet having a flow identifier specified by the sorting means is a loop packet or whether a flow specified by the flow identifier is a loop flow.

(Supplementary Note 5)

In the loop detecting device described in the Supplementary note 1, the receiving means receives packet information including a flow identifier for identifying a flow of each packet as the first predetermined information and, as the second predetermined information, information about each field that changes each time the packet is transferred.

(Supplementary Note 6)

In the loop detecting device described in the Supplementary note 1 or 5, the receiving means receives packet information including a flow identifier for identifying a flow of each packet as the first predetermined information and information about a TTL or an input port as the second predetermined information.

(Supplementary Note 7)

In the loop detecting device described in the Supplementary note 5 or 6, the determining means classifies the second predetermined information for each flow identifier specified by the sorting means, and compares the number of types of the classified second predetermined information and a third threshold value to thereby determine whether a flow specified by a flow identifier specified by the sorting means is a loop flow.

(Supplementary Note 8)

The loop detecting device described in any one of the appendices 1 to 7 includes control information generating means which generates control information including at least a flow identifier for a loop packet or a loop flow determined by the determining means as a condition for a packet to be controlled, the control information giving instructions for control on each packet that matches the condition. The control information generating means transmits the control information to the packet information extracting means.

(Supplementary Note 9)

The loop detecting device described in any one of the appendices 1 to 8 includes path information storing means which stores therein path information indicative of a flow path for each flow identifier, and control information generating means which generates control information including at least a flow identifier for a loop packet or a loop flow determined by the determining means as a condition for a packet to be controlled, the control information giving instructions for control on each packet that matches the condition. The control information generating means specifies a packet transfer device on the path corresponding to the flow identifier, based on the Path information and transmits the control information to the packet transfer device.

(Supplementary Note 10)

In the loop detecting device described in the Supplementary note 8 or 9, the control information generating means generates control information for giving instructions for any of at least discarding of a packet, QoS control and bandwidth control.

(Supplementary Note 11)

A loop detecting system includes: a packet information extracting device which extracts information from each packet transmitted and received between packet transfer devices; and a loop detecting device which detects a loop packet or a loop flow using the information extracted by the packet information extracting device, wherein the packet information extracting device includes extracting means which extracts from each packet passing through the packet information extracting device, packet information including first predetermined information and second predetermined information in the packet, and transmitting means which transmits the packet information to the loop detecting device, and wherein the loop detecting device includes receiving means which receives the packet information from the packet information extracting device, sorting means which classifies the packets from each of which information is extracted by the packet information extracting device, based on the first predetermined information included in the packet information, counts the number of the classified packets for each first predetermined information, and specifies first predetermined information in which a count result reaches greater than or equal to a first threshold value, and determining means which determines whether each packet having the first predetermined information specified by the sorting means is a loop packet or whether each flow specified by the first predetermined information is a loop flow by using the second predetermined information included in the packet information received by the receiving means with the first predetermined information specified by the sorting means as a target.

(Supplementary Note 12)

In the loop detecting system described in the Supplementary note 11, the extracting means extracts packet information including a flow identifier for identifying a flow of each packet as first predetermined information and information about each field that does not change at an end-to-end and changes for each packet even in the same flow as second predetermined information.

(Supplementary Note 13)

A loop detecting method comprises the steps of: receiving from a packet information extracting device for extracting information from each packet transmitted and received between packet transfer devices, packet information including first predetermined information and second predetermined information in the packet; classifying the packets from each of which information is extracted by the packet information extracting device, based on the first predetermined information included in the packet information, counting the number of the classified packets for each first predetermined information, specifying first predetermined information in which a count result reaches greater than or equal to a first threshold value; and determining whether each packet having the specified first predetermined information is a loop packet or whether each flow specified by the first predetermined information is a loop flow by using the second predetermined information included in the received packet information with the specified first predetermined information as a target.

(Supplementary Note 14)

The loop detecting method described in the Supplementary note 13 includes the steps of receiving packet information including a flow identifier for identifying a flow of each packet as first predetermined information and information about each field that does not change at an end-to-end and changes for each packet even in, the same flow as second predetermined information.

(Supplementary Note 15)

A loop detecting program causes a computer to execute a reception process for receiving from a packet information extracting device that extracts information from each packet transmitted and received between packet transfer devices, packet information including first predetermined information and second predetermined information in the packet; a sorting process for classifying the packets from each of which information is extracted by the packet information extracting device, based on the first predetermined information included in the packet information, counting the number of the classified packets for each first predetermined information, and specifying first predetermined information in which a count result reaches greater than or equal to a first threshold value; and a determination process for determining whether each packet having the first predetermined information specified in the sorting process is a loop packet or whether each flow specified by the first predetermined information is a loop flow by using the second predetermined information included in the packet information received in the reception process with the first predetermined information specified in the sorting process as a target.

(Supplementary Note 16)

The loop detecting program described in the Supplementary note 15 causes the computer to receive, in the reception process, packet information including a flow identifier for identifying a flow of each packet as first predetermined information and information about each field that does not change at an end-to-end and changes for each packet even in the same flow as second predetermined information.

(Supplementary Note 17)

A loop detecting device includes: a reception unit which receives from a packet information extracting device for extracting information from each packet transmitted and received between packet transfer devices, packet information including first predetermined information and second predetermined information in the packet; a sorting unit which classifies the packets from each of which information is extracted by the packet information extracting device, based on the first predetermined information included in the packet information, counts the number of the classified packets for each first predetermined information, and specifies first predetermined information in which a count result reaches greater than or equal to a first threshold value; and a determination unit which determines whether each packet having the first predetermined information specified by the sorting unit is a loop packet or whether each flow specified by the first predetermined information is a loop flow by using the second predetermined information included in the packet information received by the reception unit with the first predetermined information specified by the sorting unit as a target.
(Supplementary Note 18)

In the loop detecting device described in the Supplementary note 17, the reception unit receives packet information including a flow identifier for identifying a flow of each packet as the first predetermined information and, as the second predetermined information, information about each field that does not change at an end-to-end and changes for each packet even in the same flow.
(Supplementary Note 19)

In the loop detecting device described in the Supplementary note 17, the reception unit receives packet information including a flow identifier for identifying a flow of each packet as the first predetermined information and, as the second predetermined information, any of at least a packet payload, a TCP sequence number, information about an ID field, and an RTP sequence number.
(Supplementary Note 20)

In the loop detecting device described in the Supplementary note 18, the determination unit classifies packets each having a flow identifier specified by the sorting unit, based on a set of the flow identifier and the second predetermined information, counts the number of the classified packets for each set of the flow identifier and the second predetermined information, and compares a count result and a second threshold value to thereby determine whether a packet having a flow identifier specified by the sorting unit is a loop packet or whether a flow specified by the flow identifier is a loop flow.
(Supplementary Note 21)

In the loop detecting device described in the Supplementary note 17, the reception unit receives packet information including a flow identifier for identifying a flow of each packet as the first predetermined information and, as the second predetermined information, information about each field that changes each time the packet is transferred.
(Supplementary Note 22)

In the loop detecting device described in the Supplementary note 17, the reception unit receives packet information including a flow identifier for identifying a flow of each packet as the first predetermined information and information about a TTL or an input port as the second predetermined information.
(Supplementary Note 23)

In the loop detecting device described in the Supplementary note 21, the determination unit classifies the second predetermined information for each flow identifier specified by the sorting unit, and compares the number of types of the classified second predetermined information and a third threshold value to thereby determine whether a flow specified by a flow identifier specified by the sorting unit is a loop flow.
(Supplementary Note 24)

A loop detecting system includes: a packet information extracting device which extracts information from each packet transmitted and received between packet transfer devices; and a loop detecting device which detects a loop packet or a loop flow using the information extracted by the packet information extracting device, wherein the packet information extracting device includes an extraction unit which extracts from each packet passing through the packet information extracting device, packet information including first predetermined information and second predetermined information in the packet, and a transmission unit which transmits the packet information to the loop detecting device, and wherein the loop detecting device includes a reception unit which receives the packet information from the packet information extracting device, a sorting unit which classifies the packets from each of which information is extracted by the packet information extracting device, based on the first predetermined information included in the packet information, counts the number of the classified packets for each first predetermined information, and specifies first predetermined information in which a count result reaches greater than or equal to a first threshold value, and a determination unit which determines whether each packet having the first predetermined information specified by the sorting unit is a loop packet or whether each flow specified by the first predetermined information is a loop flow by using the second predetermined information included in the packet information received by the reception unit with the first predetermined information specified by the sorting unit as a target.

Although the invention of the present application has been described above with reference to the exemplary embodiments, the invention of the present application is not limited to the above exemplary embodiments. The configuration and details of the invention of the present application are open to various changes that can be understood by those skilled in the art within the scope of the invention of the present application.

This application claims priority based on Japanese Patent Application No. 2010-035096 filed on Feb. 19, 2010, the disclosure of which is incorporated herein by reference in its entirety.

INDUSTRIAL APPLICABILITY

The present invention is applied suitably to a loop detecting system which detects a loop packet or a loop flow.

REFERENCE SIGNS LIST

100 Measuring device
110 Capture unit
120 Measurement information generating unit
130 Flow control unit
200 Loop detecting system
202 Storage device
210 Reception unit
220 Sorting unit
230 Detecting unit
240 Control information generating unit
300 Switch

The invention claimed is:
1. A loop detecting device comprising:
a receiving unit which receives from a packet information extracting device for extracting information from each packet transmitted and received between packet transfer devices, packet information including first predetermined information and second predetermined information in the packet;

a sorting unit which classifies the packets from each of which information is extracted by the packet information extracting device, based on the first predetermined information included in the packet information, counts a number of the classified packets for each first predetermined information, and specifies the first predetermined information in which a count result reaches greater than or equal to a first threshold value; and a determining unit which determines whether each packet having the first predetermined information specified by the sorting unit comprises a loop packet or whether each flow specified by the first predetermined information comprises a loop flow by using the second predetermined information included in the packet information received by the receiving unit with the first predetermined information specified by the sorting unit as a target.

2. The loop detecting device according to claim 1, wherein the receiving unit receives packet information including a flow identifier for identifying a flow of each packet as the first predetermined information and, as the second predetermined information, information about each field that does not change at an end-to-end and changes for each packet even in a same flow.

3. The loop detecting device according to claim 1, wherein the receiving unit receives packet information including a flow identifier for identifying a flow of each packet as the first predetermined information and, as the second predetermined information, any of at least a packet payload, a Transmission Control Protocol (TCP) sequence number, information about an ID field, and a Real-time Transport Protocol (RTP) sequence number.

4. The loop detecting device according to claim 2, wherein the determining unit classifies packets each having the flow identifier specified by the sorting unit, based on a set of the flow identifier and the second predetermined information, counts the number of the classified packets for each set of the flow identifier and the second predetermined information, and compares a count result and a second threshold value to thereby determine whether each packet having a flow identifier specified by the sorting unit comprises a loop packet or whether each flow specified by the flow identifier comprises a loop flow.

5. The loop detecting device according to claim 1, wherein the receiving unit receives packet information including a flow identifier for identifying a flow of each packet as the first predetermined information and, as the second predetermined information, information about each field that changes each time the packet is transferred.

6. The loop detecting device according to claim 1, wherein the receiving unit receives packet information including a flow identifier for identifying a flow of each packet as the first predetermined information and information about a Time-to-Live (TTL) or an input port as the second predetermined information.

7. The loop detecting device according to claim 5, wherein the determining unit classifies the second predetermined information for each flow identifier specified by the sorting unit, and compares a number of types of the classified second predetermined information and a third threshold value to thereby determine whether a flow specified by a flow identifier specified by the sorting unit comprises a loop flow.

8. A loop detecting system comprising:
a packet information extracting device which extracts information from each packet transmitted and received between packet transfer devices; and a loop detecting device which detects a loop packet or a loop flow using the information extracted by the packet information extracting device, wherein the packet information extracting device includes:
an extracting unit which extracts from each packet passing through the packet information extracting device, packet information including first predetermined information and second predetermined information in the packet, and
a transmitting unit which transmits the packet information to the loop detecting device; and wherein the loop detecting device includes:
a receiving unit which receives the packet information from the packet information extracting unit,
a sorting unit which classifies the packets from each of which information is extracted by the packet information extracting device, based on the first predetermined information included in the packet information, counts a number of the classified packets for each first predetermined information, and specifies first predetermined information in which a count result reaches greater than or equal to a first threshold value, and
a determining unit which determines whether each packet having the first predetermined information specified by the sorting unit comprises a loop packet or whether each flow specified by the first predetermined information comprises a loop flow by using the second predetermined information included in the packet information received by the receiving unit with the first predetermined information specified by the sorting unit as a target.

9. A loop detecting method comprising:
receiving from a packet information extracting device for extracting information from each packet transmitted and received between packet transfer devices, packet information including a flow identifier for identifying each flow and predetermined information in the packet;
classifying the packets from each of which information is extracted by the packet information extracting device, based on the flow identifier included in the packet information, counting a number of the classified packets for each flow identifier, and specifying the flow identifier in which a count result reaches greater than or equal to a first threshold value; and
determining whether each packet having the specified flow identifier comprises a loop packet or whether each flow specified by the flow identifier comprises a loop flow by using the predetermined information included in the received packet information with the specified flow identifier as a target.

10. A non-transitory computer-readable information recording medium storing a loop detecting program which, when executed by a processor, performs:
receiving from a packet information extracting device that extracts information from each packet transmitted and received between packet transfer devices, packet information including a flow identifier for identifying each flow and predetermined information in the packet;
classifying the packets from each of which information is extracted by the packet information extracting device, based on the flow identifier included in the packet information, counting a number of the classified packets for each flow identifier, and specifying the flow identifier in which a count result reaches greater than or equal to a first threshold value; and determining whether each packet having the flow identifier specified in said specifying comprises a loop packet or whether each flow specified by the flow identifier comprises a loop flow by using the predetermined information included in the packet information received with the flow identifier specified in said specifying as a target.

11. A loop detecting device comprising:
receiving means for receiving from a packet information extracting device for extracting information from each packet transmitted and received between packet transfer devices, packet information including a flow identifier for identifying each flow and predetermined information in the packet;
sorting means for classifying the packets from each of which information is extracted by the packet information extracting device, based on the flow identifier included in the packet information, counts a number of the classified packets for each flow identifier, and specifies the flow identifier in which a count result reaches greater than or equal to a first threshold value; and
determining means for determining whether each packet having the flow identifier specified by the sorting means comprises a loop packet or whether each flow specified by the flow identifier comprises a loop flow by using the predetermined information included in the packet information received by the receiving means with the flow identifier specified by the sorting means as a target.

12. The loop detecting device according to claim 1, wherein the first predetermined information comprises a flow identifier.

13. The loop detecting device according to claim 1, wherein the second predetermined information comprises one of a payload and a Time-to-Live (TTL).

14. The loop detecting device according to claim 1, wherein the determining unit classifies packets each having the flow identifier specified by the sorting unit, based on a set of the flow identifier and the second predetermined information.

15. The loop detecting device according to claim 14, wherein the determining unit counts a number of the classified packets for each set of the flow identifier and the second predetermined information.

16. The loop detecting device according to claim 1, wherein said determining unit determines whether each packet having the first predetermined information specified by the sorting unit comprises a loop packet or whether each flow specified by the first predetermined information comprises a loop flow only for packets in which said count result is greater than or equal to said threshold value.

* * * * *